(12) United States Patent
Amemiya et al.

(10) Patent No.: US 7,009,568 B2
(45) Date of Patent: Mar. 7, 2006

(54) INFORMATION PROCESSING APPARATUS

(75) Inventors: Ryoji Amemiya, Kanagawa (JP); Shinichi Ogasawara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/927,835

(22) Filed: Aug. 27, 2004

(65) Prior Publication Data
US 2005/0024278 A1 Feb. 3, 2005

Related U.S. Application Data

(62) Division of application No. 10/030,598, filed as application No. PCT/JP01/03834 on May 8, 2001, now Pat. No. 6,804,110.

(30) Foreign Application Priority Data

| May 9, 2000 | (JP) | ................................ 2000-142258 |
| Oct. 26, 2000 | (JP) | ................................ 2000-327226 |

(51) Int. Cl.
*H01Q 1/24* (2006.01)

(52) U.S. Cl. ................................ 343/702; 343/700 MS

(58) Field of Classification Search ................ 343/702, 343/700 MS, 872, 873; 361/683, 679, 686; 455/90.1, 90.2, 90.3; H01Q 1/24
See application file for complete search history.

(56) References Cited

U.S. PATENT DOCUMENTS

| 5,138,328 | A | * | 8/1992 | Zibrik et al. ................. 343/702 |
| 6,285,328 | B1 | * | 9/2001 | Masaki et al. ............... 343/702 |
| 6,344,825 | B1 | * | 2/2002 | Wong .......................... 343/702 |
| 6,670,926 | B1 | * | 12/2003 | Miyasaka ..................... 343/702 |
| 6,686,886 | B1 | * | 2/2004 | Flint et al. ................... 343/702 |
| 6,853,336 | B1 | * | 2/2005 | Asano et al. ................ 343/702 |
| 6,930,644 | B1 | * | 8/2005 | Konishi et al. .............. 343/702 |

* cited by examiner

Primary Examiner—Hoanganh Le
(74) Attorney, Agent, or Firm—Frommer Lawrence & Haug LLP; William S. Frommer

(57) ABSTRACT

To provide an information processing apparatus having an antenna with a high sensitivity. There are provided a display unit 3 having a display panel whose rear surface is covered with a metallic panel 3B, an antenna member 35 which is disposed in a notch 37 formed in a part of the above described metallic panel, and covers 41 and 61 of non-metallic members disposed in the above described notch so as to cover the above described antenna member.

5 Claims, 31 Drawing Sheets (a)

(b)

(c)

INFORMATION PROCESSING APPARATUS

CROSS-REFERENCE TO RELATED APPLICATION

This application is a divisional application of U.S. patent application Ser. No. 10/030,598, filed Jan. 7, 2002, now U.S. Pat. No. 6,804,110 which is a 371 of PCT/JP01/03834 filed May 8, 2001.

TECHNICAL FIELD

The present invention relates to an information processing apparatus which has a display unit foldable against a main body.

BACKGROUND ART

There have recently been offered as commercial products a large number of portable information processing apparatuses such as notebook personal computers and mobile computers. Such an information processing apparatus consists of a main unit and a display unit, and the display unit can be closed and opened against/from the main unit with a hingeable means. Such an information processing apparatus is recently equipped with an antenna and the like so that data can be exchanged between information processing apparatuses.

FIG. 47 is a perspective view showing a conventional information processing apparatus in which a display unit is opened from a main unit of this computer which is equipped with an antenna.

This computer 400 consists of a main unit 410 having a metallic panel and a display unit 420 having a metallic panel which can be folded and opened against/from the main unit 410. An antenna 430 is rotatably disposed on a side surface of the main unit 410. Such the antenna 430 is rotated so as to be erected from the main unit 410 as shown in the drawing when the antenna 430 is to be used, while the antenna 430 is rotated to be nearly in parallel with the main unit 410 when the antenna 430 is not to be used.

In the above described conventional computer 400 in which the metallic panel produces an adverse influence on the antenna, the antenna 430 is disposed so as to protrude from a side surface of the main unit 410. Accordingly, the antenna 430 causes a problem that articles are liable to be caught by the antenna 430, whereby the antenna 430 or others may be broken. Furthermore, the antenna 430 has a defect that it may not match the main unit 410 and the like in design.

FIG. 48 is a perspective view showing another conventional information processing apparatus in which a display unit is open from a main unit of this computer having an antenna and the like.

This computer 500 has a display unit 520 which is attached to a main unit 510 so as to be capable of freely opening and closing. An antenna 530 is built inside a side surface of the main unit 510.

Such a computer 500 is capable of solving the above described problems, but since radio waves coming from the left and the front as seen from a user pass through inside the main unit 510 and then attain to the antenna 530, the computer 500 causes a problem that radio waves are troubled by built-in electronic parts in their courses, thereby lowering a sensitivity of the antenna 530.

DESCRIPTION OF THE INVENTION

The present invention therefore has an object to solve the above described problems and provide an information processing apparatus which is equipped with an antenna having a high sensitivity.

The present invention accomplishes the above described object by equipping an information processing apparatus with a display unit having a display panel of which rear side is covered with a metallic panel, an antenna member which is disposed in a notch formed in part of the above described metallic panel and a cover of a non-metallic member which is disposed in the above described notch so as to cover the above described antenna member.

The above described configuration in which the antenna is disposed in the notch formed in the metallic panel allows radio waves to be securely received by the antenna or transmitted from the antenna without being intercepted by the metallic panel. Accordingly, the configuration makes it possible to always receive and transmit accurate data and the like securely and rapidly.

BEST MODE FOR CARRYING OUT THE INVENTION

Now, preferable embodiments of the present invention will be described in detail with reference to the accompanying drawings.

The embodiments which are described below are specific preferable examples of the present invention in which various technically preferable definitions are made, and a scope of the present invention is not limited by these embodiment so far as a statement limitative of the present invention is not made in the following description.

(First Embodiment)

Figure 1:
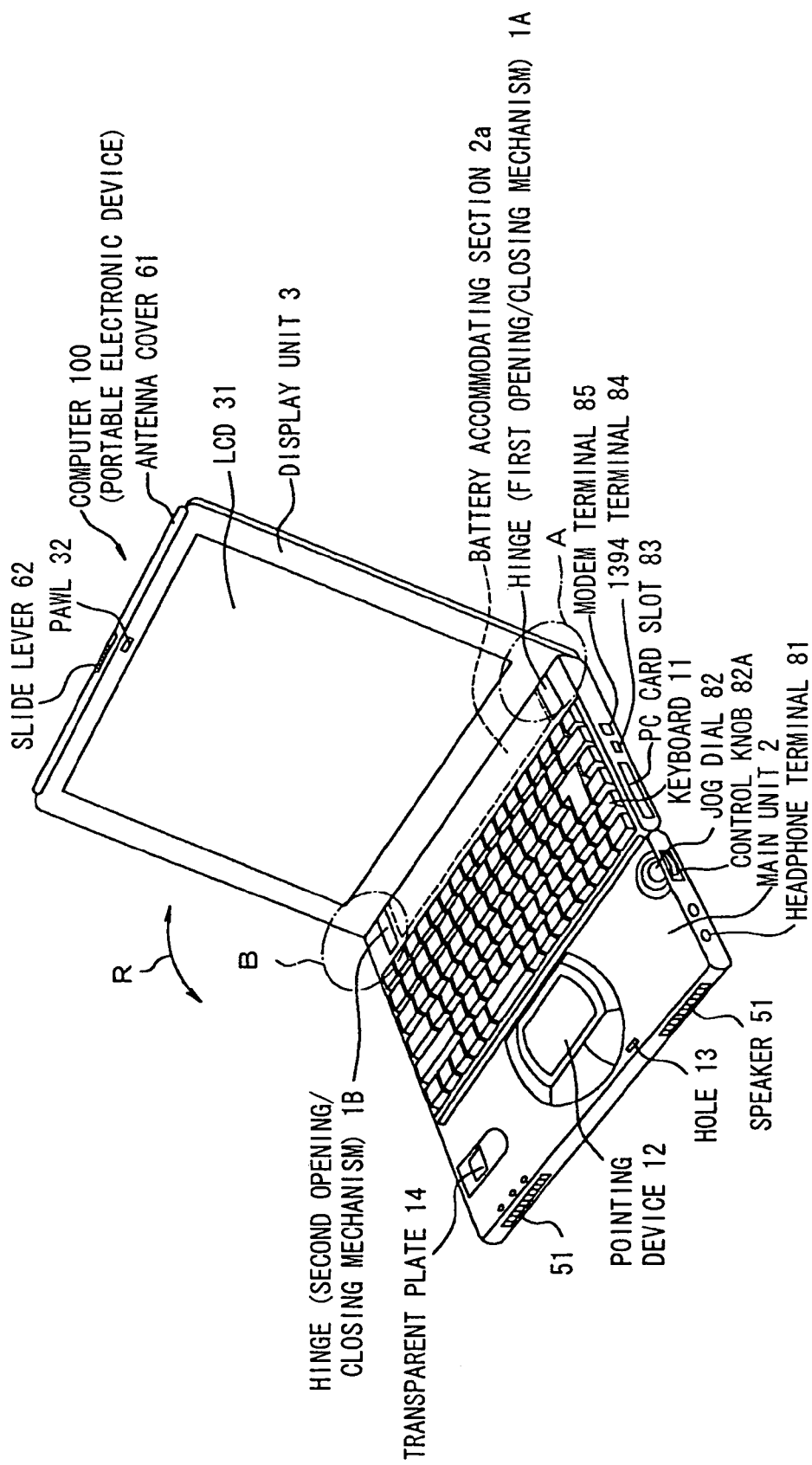
FIG. 1 is a perspective view showing a portable computer having a display unit which can be folded and opened against/from a main unit as a first embodiment of the information processing apparatus of the present invention.
Figure 2:
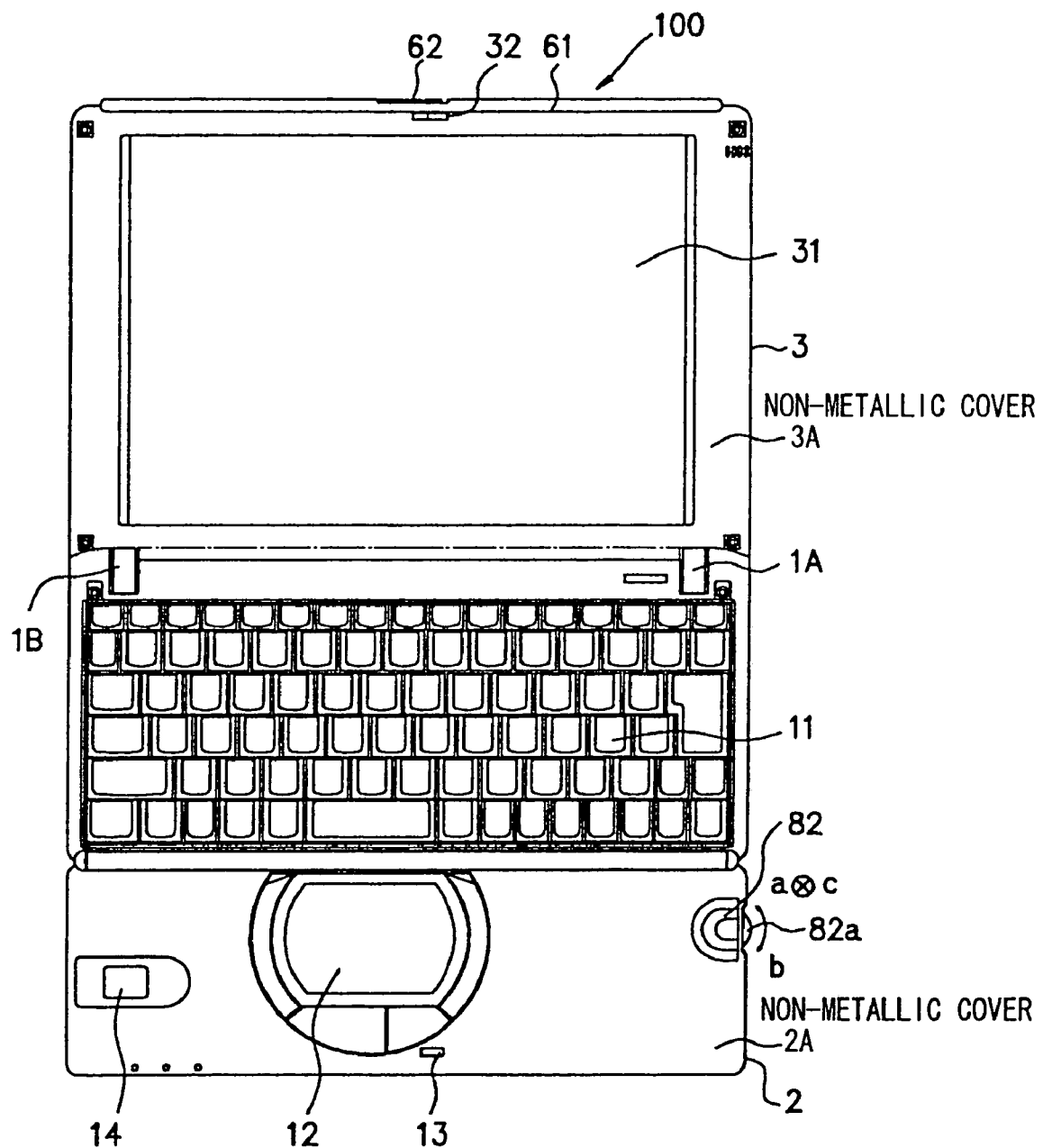
FIG. 2 is a plan view of the computer shown in FIG. 1 in a condition where the display unit is opened by 180 degrees from the main unit.

FIG. 1 is a perspective view showing a portable computer which is a first embodiment of the information processing apparatus of the present invention, with a display unit that can be folded and opened against/from a main unit. FIG. 2 is a plan view in which the display unit of the computer shown in FIG. 1 is opened by approximately 180 degrees from the main unit. FIGS. 3 through 8 are a plan view as seen from the display unit side, a plan view, a front view, a rear view, a right side view and a left side view, as seen from the main unit side, in a condition where the display unit is folded against the main unit.

This computer 100 is configured so that a main unit 2 and a display unit 3 can be opened and closed. (folded) in directions indicated by an arrow R by hinges 1A (a first opening/closing mechanism) and 1B (a second opening/closing mechanism) surrounded by an A region and a B region which are described in detail later. A battery pack which is described in detail later is detachably accommodated in a battery accommodating section 2*a* provided between the hinges 1A and 1B of the main unit 2. In description that follows, surfaces of the main unit 2 and the display unit 3 which face each other will be referred to as a top surface and a front surface respectively, and surfaces opposite to them will be referred to as a bottom surface and a rear surface respectively.

Figure 4:
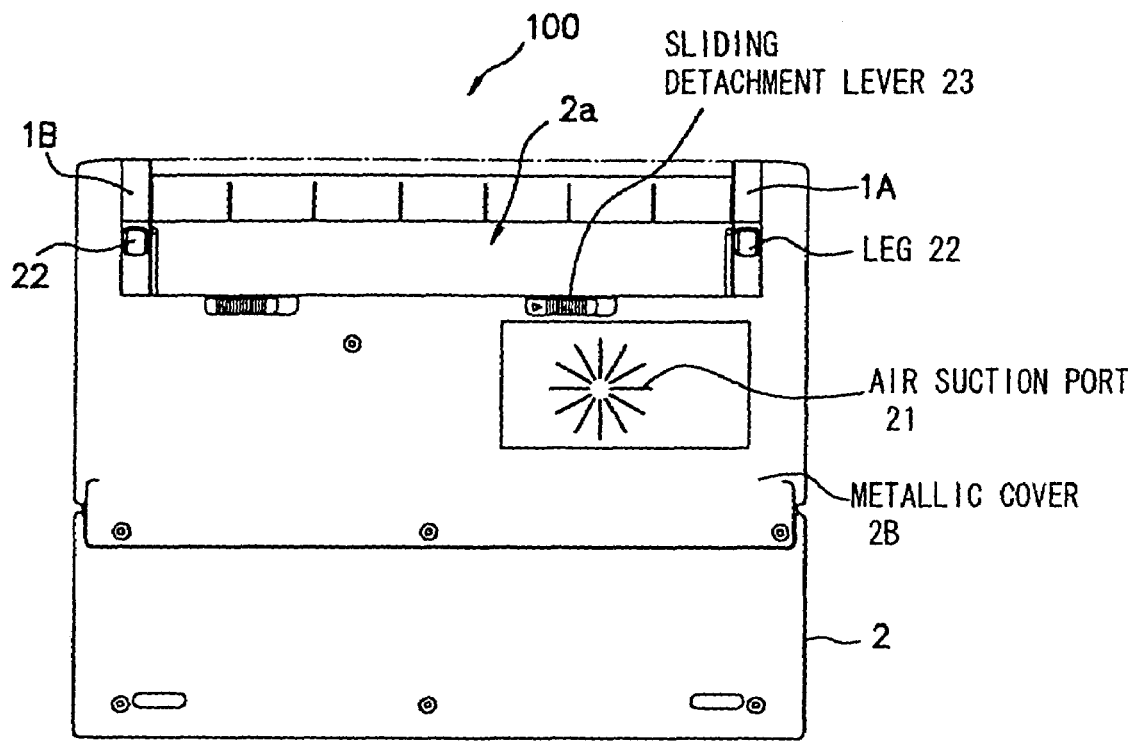
FIG. 4 is a plan view of the computer shown in FIG. 3 as seen from the main unit side.

A keyboard 11, a pointing device 12 and the like are arranged on the top surface of the main unit 2 and covered with a non-metallic panel 2A, for example, plastic, as shown in FIGS. 1 and 2, whereas an air suction port 21 for a built-in cooling fan, a pair of legs 22, a sliding detachment levers 23 for removing the battery pack from the battery accommodating section 2a and the like are arranged on the bottom surface of the main unit 2 and covered with a metallic panel 2B made of magnesium alloy, aluminium alloy or the like as shown in FIG. 4.

Figure 3:
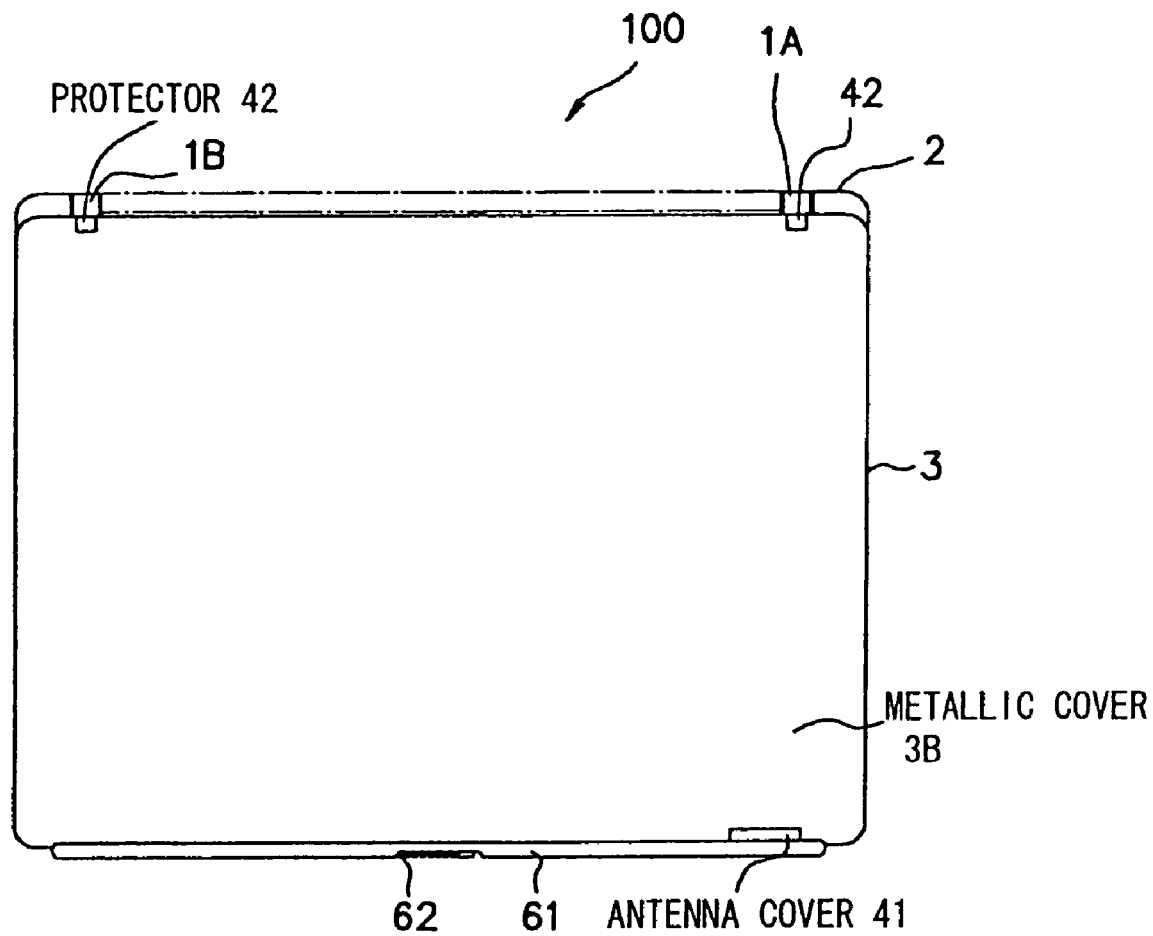
FIG. 3 is a plan view of the computer shown in FIG. 1 as seen from the display unit side in a condition where the display unit is folded against the main unit.

Furthermore, a liquid crystal display (LCD) 31 and the like, for example, are arranged on the front surface of the display unit 3 as shown in FIGS. 1 and 2, and covered with a panel 3A made of a non-metallic material such as plastic, whereas the rear surface of the display unit 3, except an antenna cover 41 for covering an antenna described in detail later as shown in FIG. 3, is covered entirely with a metallic panel 3B made of a magnesium alloy, an aluminium alloy or the like. Furthermore, a pair of protectors 42 which slightly protrudes from the rear surface to prevent the edges of the display unit 3 from being scratched by a desk is arranged on the rear surface of the display unit in the vicinities of the hinges 1A and 1B.

Figure 5:
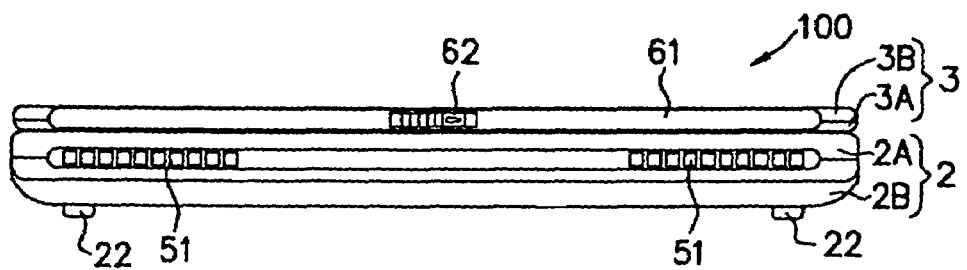
FIG. 5 is a front side view of the computer shown in FIG. 3.

As shown in FIGS. 1 and 5, arranged on the front surface of the main unit 2 is a pair of speakers 51, and arranged on the front surface of the display unit 3 are an antenna cover 61 for covering the antenna, a slide lever 62 for unlocking a pawl 32 which protrudes from the front surface of the display unit 3 from a hole 13 formed in the top surface of the main unit 2 and the like.

Figure 6:
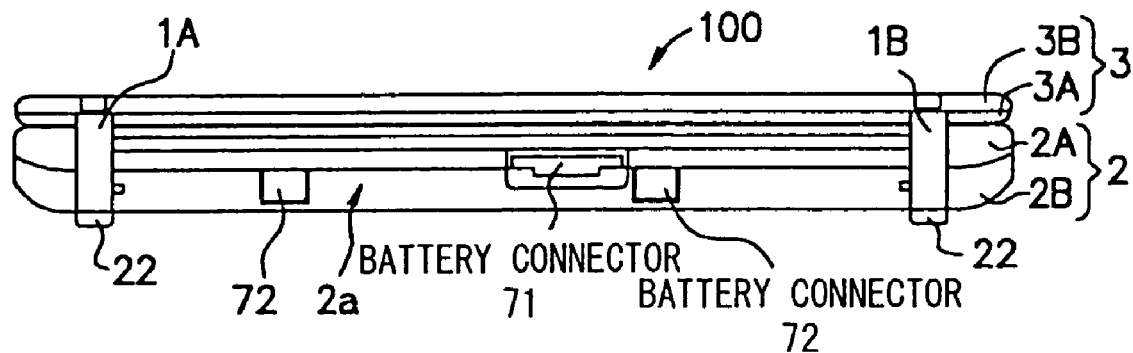
FIG. 6 is a rear side view of the computer shown in FIG. 3.

As shown in FIG. 6, battery pack connectors 71 and 72 for electrically mechanically connecting the battery pack are arranged at the battery accommodating section 2a on the rear surface of the main unit 2.

Figure 7:
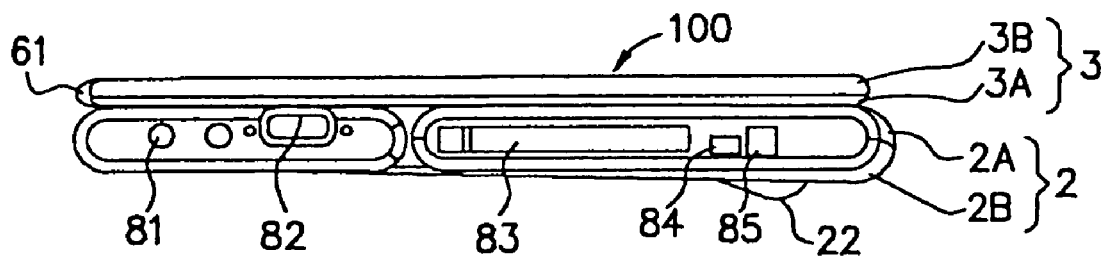
FIG. 7 is a right side view of the computer shown in FIG. 3.

As shown in FIGS. 1 and 7, arranged on a right side surface of the main unit 2 are a headphone terminal 81, a jog dial 82, a PC card slot 83 for a PC (Personal Computer) card of PCMCIA (Personal Computer Memory Card International Association) standard, an IEEE (Institute of Electrical and Electronics Engineers) 1394 terminal 84 for 4 pins, a modem terminal 85 for a modular jack and so on.

The jog dial 82 is so arranged that its side partially protrudes from the right side surface of the main unit 2 and its top surface partially protrudes so as to become the same height as the keys on the keyboard 11.

The jog dial 82 is a user interface, in which the dial is rotated and depressed, thereby offering excellent operability which permits easily carrying out a function for system setting and various functions of various application software. This jog dial 82 is configured so as to execute predetermined processing when a disk control knob 82a of a flat eye pattern is rotated in a direction indicated by an arrow a or b or depressed in a direction indicated by an arrow c as shown in FIGS. 1 and 2.

Figure 8:
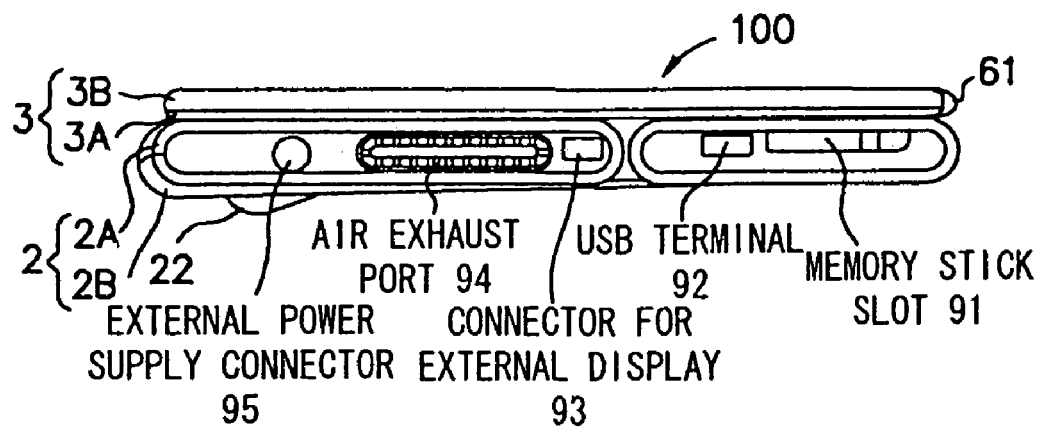
FIG. 8 is a left side view of the computer shown in FIG. 3.

As shown in FIGS. 1 and 8, arranged on a left side surface of the main unit 2 are a memory stick slot 91 for a memory stick used as a memory card, a USB (Universal Serial Bus) terminal 92, a connector 93 for external display, an air exhaust port 94, an external power supply connector 95 and so on.

A transparent plate 14 is fitted in part of the top surface of the main unit 2 corresponding to the memory stick slot 91 so that a label of a memory stick inserted into the memory stick slot 91 can be recognized from the top surface side of the main unit 2 thorough the transparent plate 14.

Figure 9:
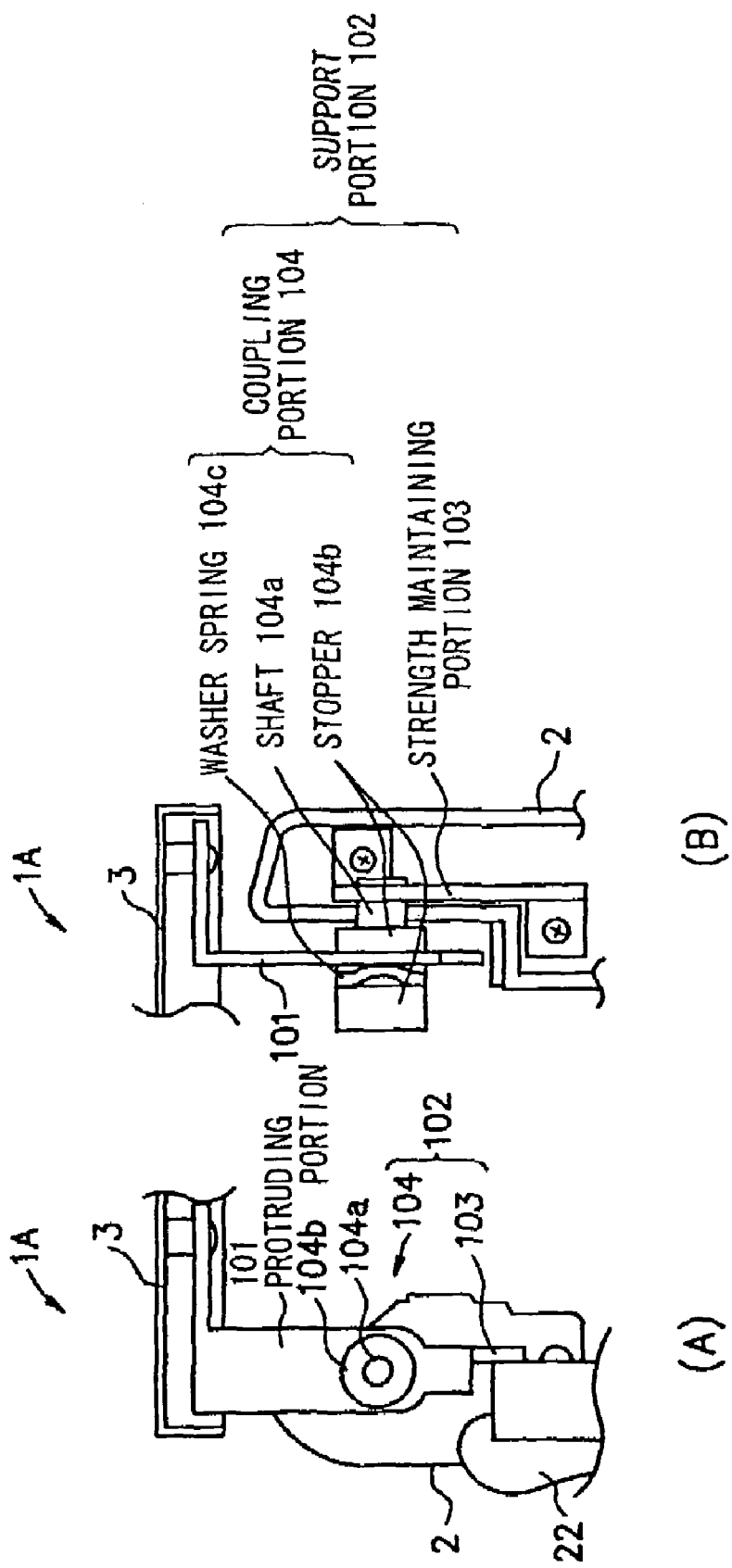
FIG. 9 is a detail side view and plan view illustrating a hinge (first opening/closing mechanism) shown in FIG. 1.

FIGS. 9(A) and 9(B) are side views seen from the left side and a detail plan view showing the hinge (the first opening/closing mechanism) 1A in a condition where the non-metallic panel 2A and the non-metallic panel 3B are removed from the main unit 2 and the display unit 3 respectively.

The hinge 1A consists of a protruding portion 101 which is fixed with a screw at an edge of the metal panel 3B of the display unit 3 so as to protrude nearly perpendicularly to a display surface of the LCD 31 of the display unit 3 and a support portion 102 which is fixed with a screw at an edge of the main unit 2 so as to rotatably support a substantial tip portion of the protruding portion 101.

The protruding portion 101 is made of material having high mechanical strength, for example, stainless steel (SUS) which is an iron-based material and formed in an L shape so that the display unit 3 maintains its strength in a stationary condition even while it is being opened and closed. An end of this protruding portion 101 is fixed with the screw at the edge of the display unit 3 and the other end of the protruding portion 101 is rotatably supported by the support portion 102.

The support portion 102 consists of a strength maintaining portion 103 for maintaining mechanical strength and a coupling portion 104 for coupling with the protruding portion 101. The strength maintaining portion 103 is made of material having high mechanical strength, for example, stainless steel (SUS) which is iron-based material and is formed in an L shape so that the display unit 3 maintains its strength while being opened and closed. The coupling portion 104 has a shaft 104a which is supported by the strength maintaining portion 103, a stopper 104b fitted over the shaft 104a, a washer spring 104c and the like, and the other end of the protruding portion 101 is fitted over the shaft 104a and integrally coupled with the stopper 104b using the washer spring 104c and the like.

Figure 10:
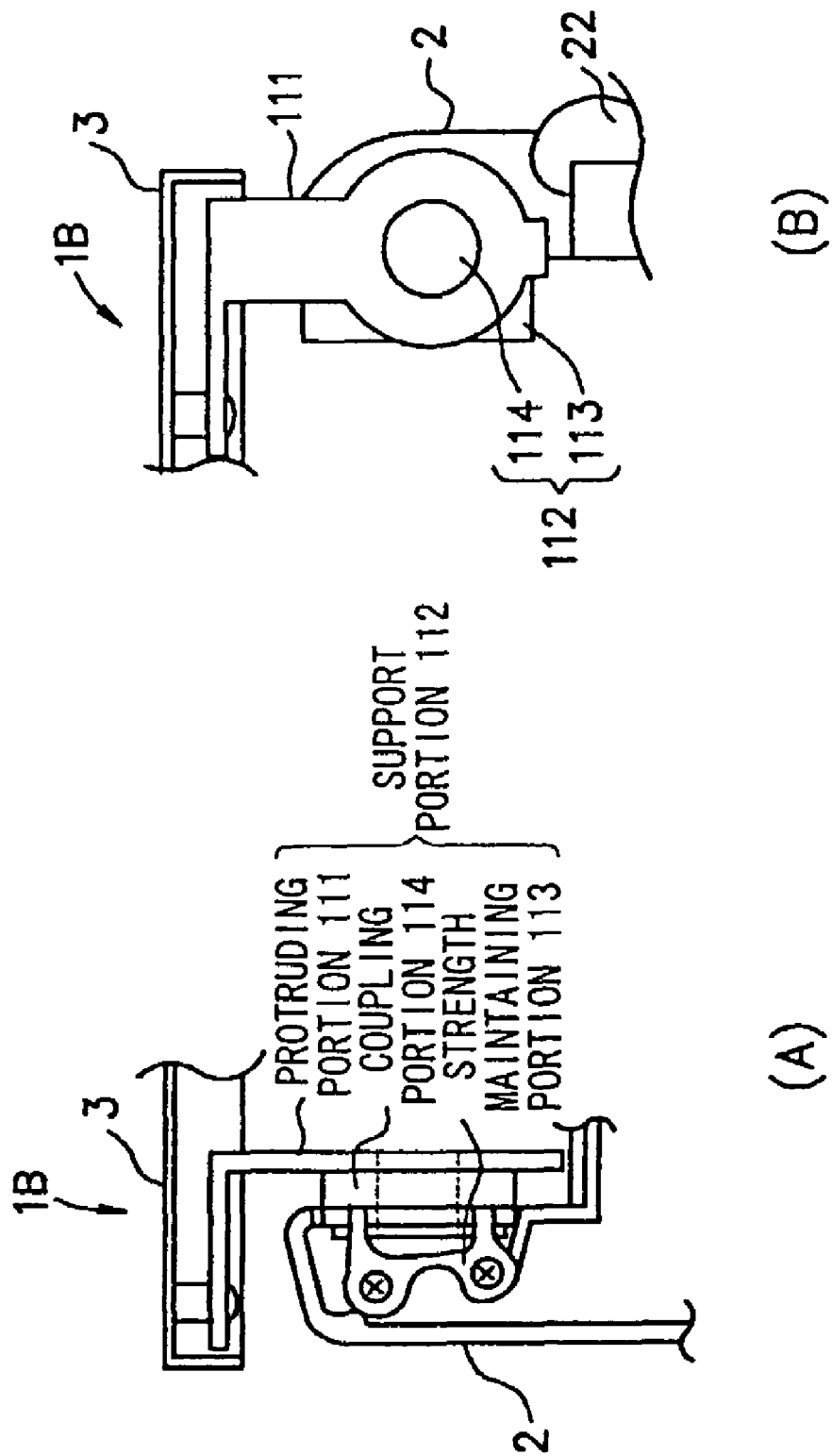
FIG. 10 is a detail side view and a plan view illustrating a hinge (second opening/closing mechanism) shown in FIG. 1.

FIGS. 10(A) and 10(B) are a plan view and a side view as seen from the right side showing details of the hinge (second opening/closing mechanism) 1B in a condition where the non-metallic panel 2A and the non-metallic panel 3B are detached from the main unit 2 and the display unit 3 respectively.

The hinge 1B consists of a protruding portion 111 which is fixed with a screw at the other end of the display unit 3 so as to protrude nearly perpendicularly to the display surface of the LCD 31 of the display unit 3 and a support portion 112 which is fixed with a screw at the other end of the main unit 2 so as to rotatably support a substantial tip portion of the protruding portion 111.

The protruding portion 11 and the support portion 112 are configured substantially the same as the protruding portion 101 and the support portion 102 of the hinge 1A, except a central portion of a coupling portion 114 of the support portion 112 which is made hollow to pass wiring or the like.

By the hinges 1A and 1B configured as described above, the protruding portions 101 and 111 can rotate with respect to the support portions 102 and 112 in directions indicated by R in FIG. 1. Since it is sufficient to dispose only the protruding portions 101 and 111 on the display unit 3 side, a lower internal portion of the display unit 3, that is, space under the LCD 31 in particular can be utilized effectively.

FIGS. 11 through 14 are partial side sectional views showing a condition where the computer 100 in which the battery pack is mounted is put on a desk and the display unit 3 is opened from the main unit 2.

Figure 11:
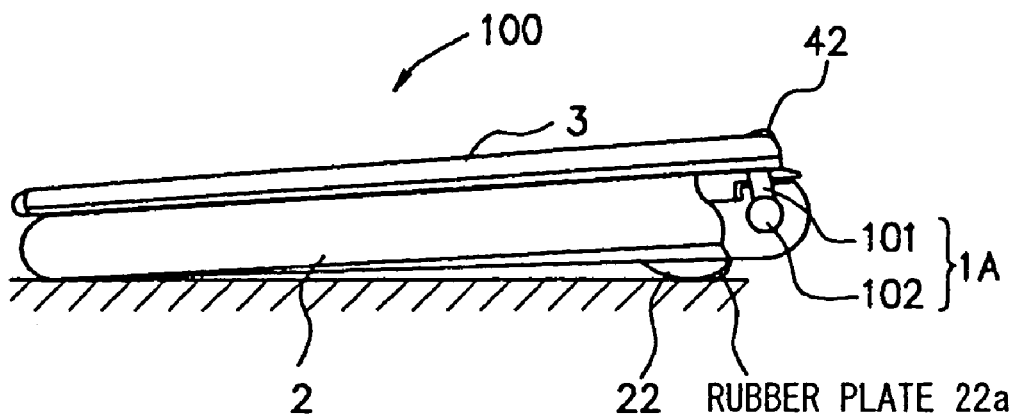
FIG. 11 is a first partial side view showing a condition where the computer shown in FIG. 1 having a battery pack inserted therein is put on a desk and the display unit is opened from the main unit.

When the computer 100 is set on a desk, for example, as shown in FIG. 11, the computer 100 is set in a condition where a rear portion of the computer 100 is raised by the pair of legs 22 higher than a front portion, that is, the computer 100 is inclined frontward. In this condition, the computer 100 does not slip on the desk surface but is stable because rubber plates 22a, for example, are stuck on the bottom surfaces of the pair of legs 22.

Figure 12:
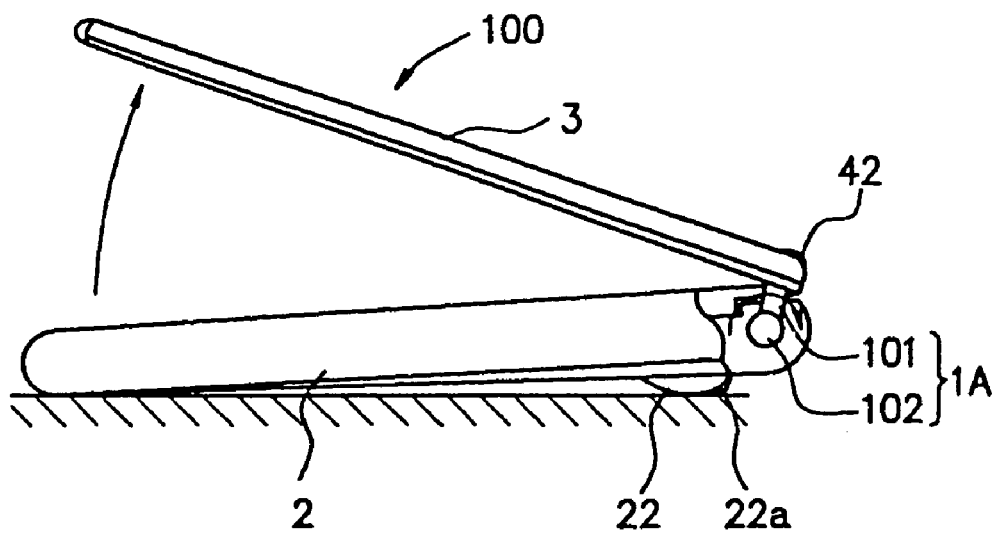
FIG. 12 is a second partial side view showing a condition where the computer shown in FIG. 1 having the battery pack inserted therein is put on the desk and the display unit is closed against the main unit.

In this condition, the pawl 32 protruding from the front surface of the display unit 3 is slided by sliding the slide lever 62, thereby releasing the pawl 32 from the hole 13 formed on the top surface of the main unit 2 and opening the display unit 3 from the main unit 2 as shown in FIG. 12. Since a rear portion of the display unit 3 is separated from the support portions 102 and 112 by the length of the protruding portions 101 and 111, the display unit turns along a rear portion of the main unit 2. Furthermore, since the rear portion of the main unit 2 is raised from the desk surface by the pair of legs 22, the rear portion of the display unit 3 is not brought into contact with the desk surface even when the display unit 3 is opened beyond 90 degrees with respect to the main unit 2, whereby the display unit 3 can be opened smoothly.

Figure 13:
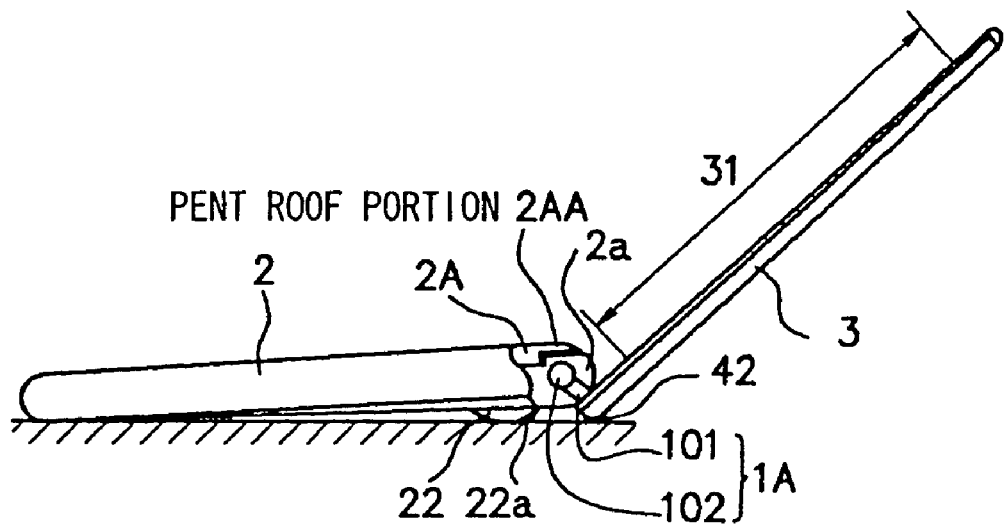
FIG. 13 is a third partial side view showing a condition where the computer shown in FIG. 1 having the battery pack inserted therein is put on the desk and the display unit is opened from the main unit.

The display unit 3 is opened to an angular position at which a user can see the LCD 31 of the display unit 3 clearly as shown in FIG. 13.

Figure 15:
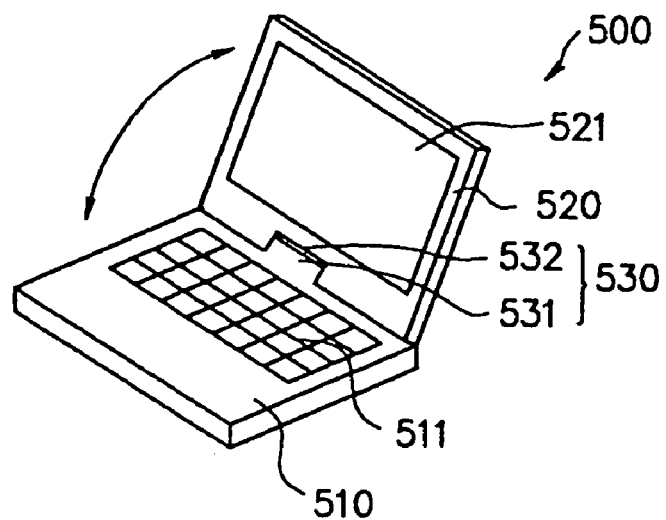
FIG. 15 is a perspective view showing a condition where a display unit of a computer as a conventional information processing apparatus is opened from a main unit.
Figure 16:
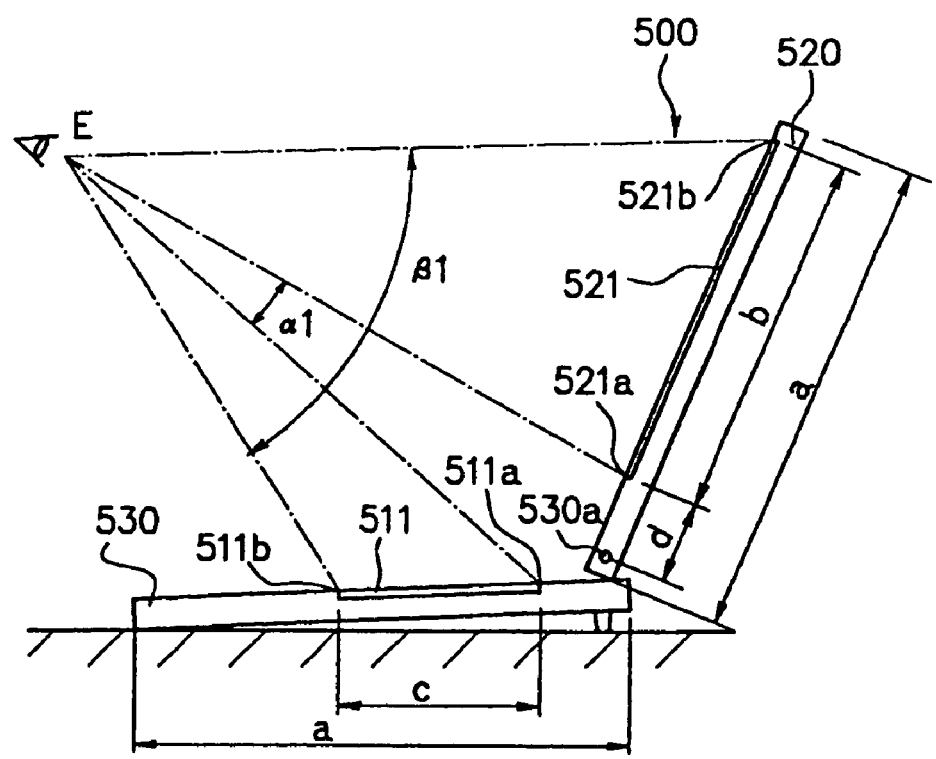
FIG. 16 is a side view of the computer shown in FIG. 15.

FIG. 15 is a perspective view showing a condition where a display unit of a computer as a conventional information processing apparatus is opened from a main unit and FIG. 16 is a side view of the computer under that condition.

In this computer 500, a display unit 520 is attached to a main unit 510 so as to be capable of opening and closing by the hinge 530 which is composed of a convex portion 531 formed nearly at the center of a main unit 510 and a concave portion 532 formed nearly at the center of the display unit 520 and engaged with the convex portion 531.

Figure 17:
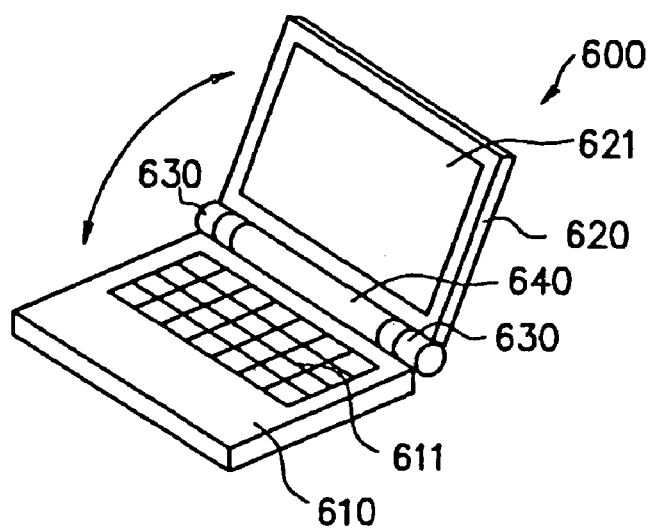
FIG. 17 is a perspective view showing a condition where a display unit of another computer as a conventional information processing apparatus is opened from a main unit.
Figure 18:
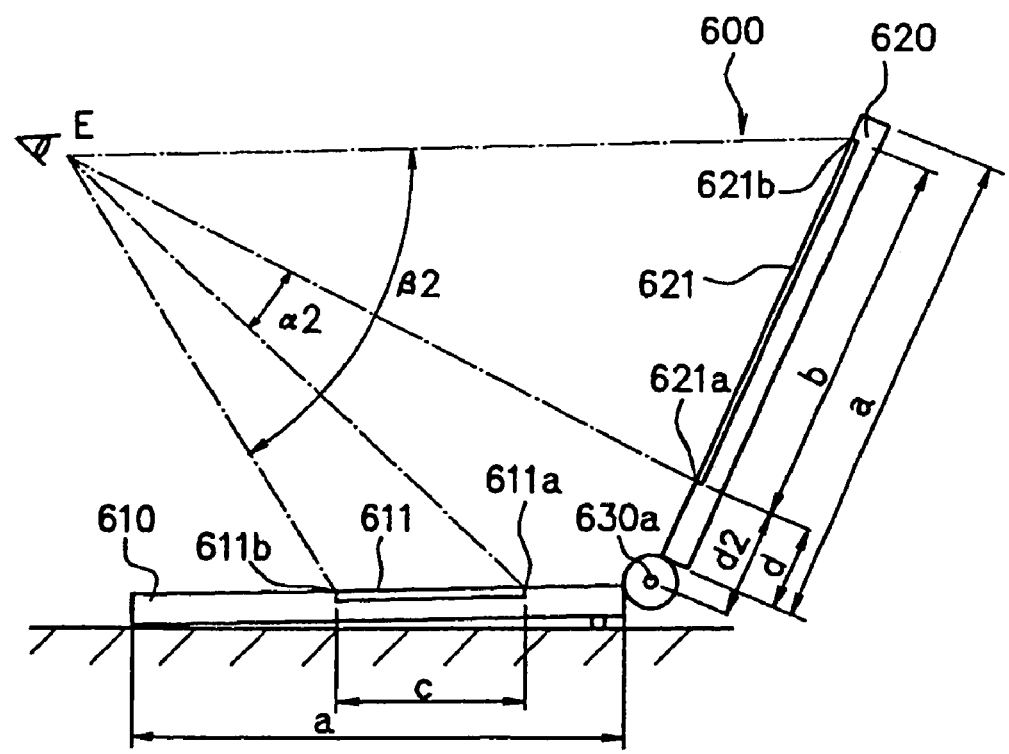
FIG. 18 is a side view of the computer shown in FIG. 17.

FIG. 17 is a perspective view showing a condition where a display unit of another computer as a conventional information processing apparatus is opened from a main unit and FIG. 18 is a side view of the computer under that condition.

In this computer 600, a display unit 620 is attached to a main unit 610 so as to be capable of opening and closing by a pair of hinges 630. A battery pack 640 is detachably inserted between the pair of hinges 630.

For use of the computer 500 or 600 put on a desk surface, a user must move his eyes between a keyboard 511 or 611 of the main unit 510 or 610 and a screen 521 or 621 of the display unit 520 or 620. Let us consider a case where the computers 500 and 600 have the main units 510, 610 and display units 520, 620 of an identical width a, the screens 521, 621 of an identical width b, the keyboards 511, 611 of an identical width c, and regions of an identical distance d under the screens 521, 621 of the display units 520, 620 which can accommodate substrates and the like. Note that, a distance between a center axis 630a of the hinges 630 and a lower end 621a of the screen 621 is denoted by $d_2$.

In this case, it will be understood that the minimum movement angles $\alpha 1$ and $\alpha 2$ of the user's eyes, that is, angles formed by upper ends 511a, 611a of the keyboards 511, 611, visual points E and lower ends 521a, 621a of the screens 521, 621, and the maximum movement angles $\beta 1$ and $\beta 2$ of the user's eyes, that is, the angles formed by lower ends 511b, 611b of the keyboards 511, 611, the visual points E and the upper ends 521b, 621b of the screens 521, 621 are greatly influenced by relative positional relations of the center axes 530 and 630a of the hinges 530 and 630, respectively.

In other words, since the above described computers 500 and 600 are configured by locating the center axes 530a and 630a of the hinges 530 and 630 outside and over the main units 510 and 610 and 600 so as to be in parallel with extension lines of the screens 521 and 621, the screens 521 and 621 are arranged at locations apart by the distance d of the regions in which the substrates and the like can be disposed, whereby the minimum movement angles $\alpha 1$ and $\alpha 2$ as well as the maximum movement angles $\beta 1$ and $\beta 2$ of the user's eyes are enlarged. Accordingly, which causes a problem that a user is easy to get tired under long term use, thereby lowering working efficiency.

Figure 19:
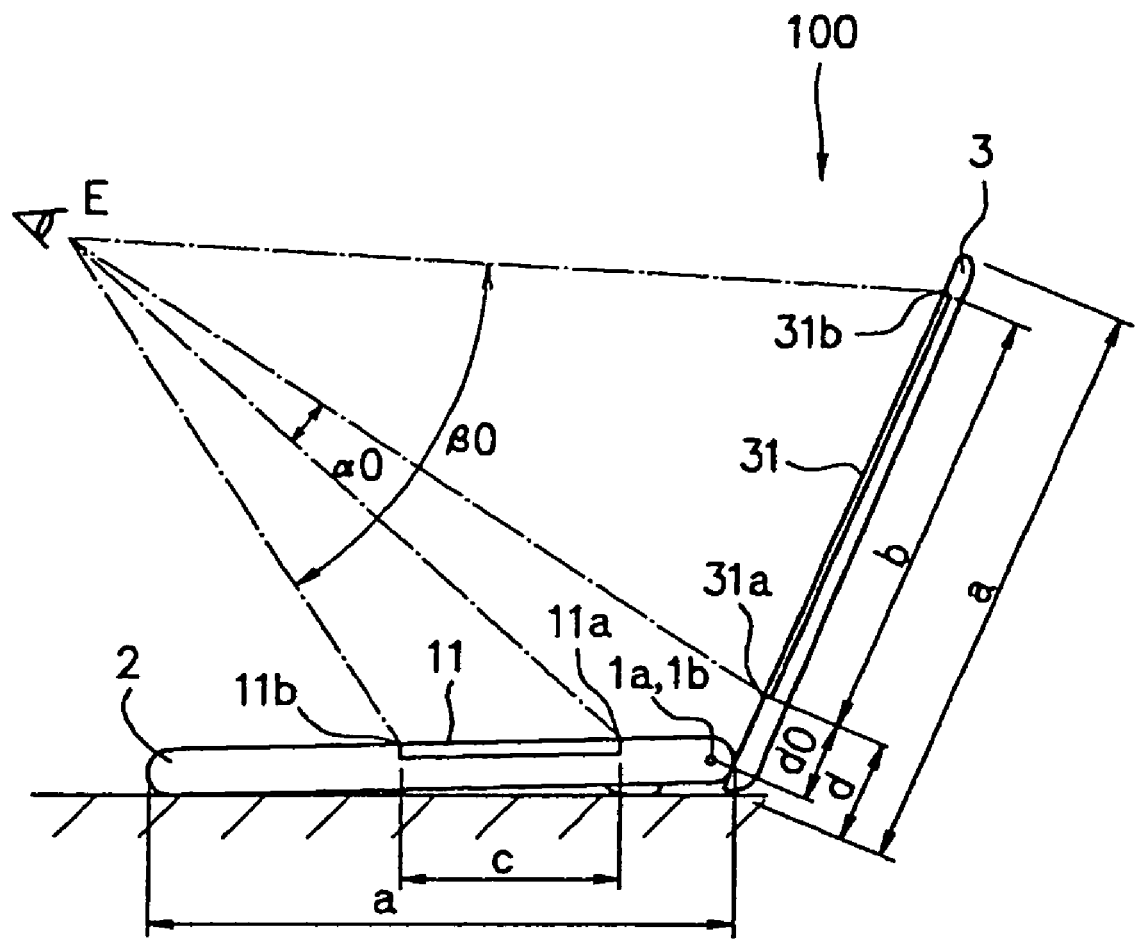
FIG. 19 is a side view showing a condition where the display unit of the computer shown in FIG. 1 is opened from the main unit.
Figure 29:
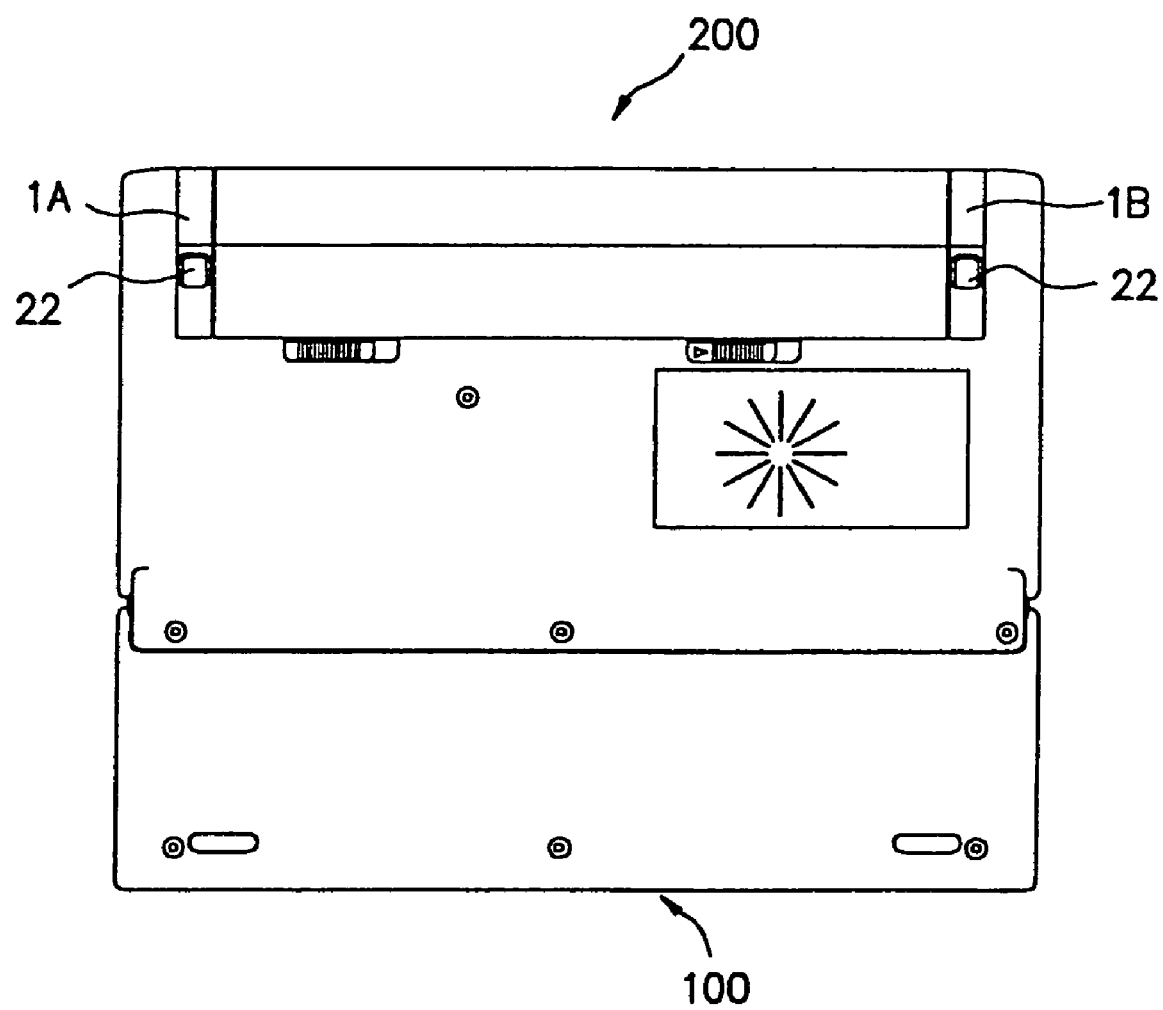
FIG. 29 is a plan view showing a condition after the battery pack is inserted in the computer shown in FIG. 1.
Figure 31:
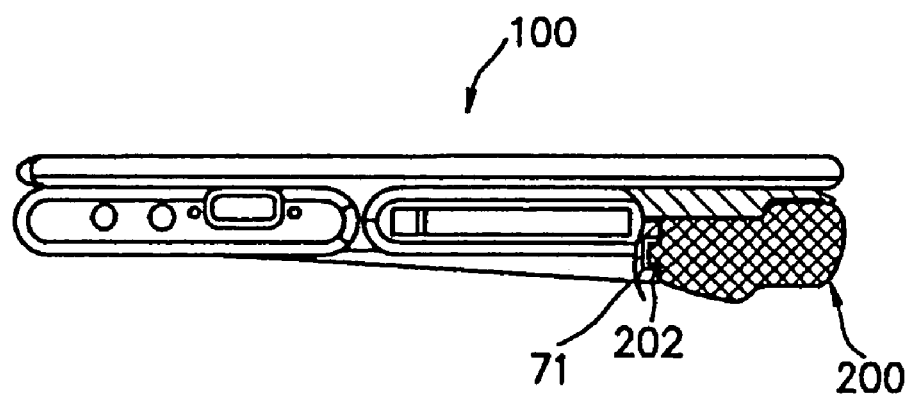
FIG. 31 is a side view showing the condition after the battery pack is inserted in the computer shown in FIG. 1.

On the other hand, FIG. 19 is a side view of the computer 100 having the main unit 2 and the display unit 3 of a width a, the LCD 31 of a width b, the key board 11 of a width c, and the region of a distance d under the LCD 31 of the display unit 3 in which the substrate and the like can be accommodated, in correspondence with those of the conventional computers 500 and 600 shown in FIGS. 29 and 31. Since the display unit 3 is disposed so as to be perpendicular to the protruding portions 101 and 111 which protrude in a radial direction from the center axes 1a and 1b of the hinges 1A and 1B which are disposed in the main unit 2, the rear portion of the display unit 3 turns behind the rear portion of the main unit 2 and the LCD 31 comes close to the keyboard 11. In other words, a distance d0 from the center axes 1a and 1b of the hinges 1A and 1B of the computer 100 to the lower end 31a of the LCD 31 in this embodiment is shorter than the distance d of the region under the LCD 31 of the display unit 3 in which the substrate and the like can be accommodated.

Accordingly, using the computer according to this embodiment, the minimum movement angle $\alpha$ of user's eyes, that is, an angle formed by an upper end 11a of the keyboard 11, a visual point E and a lower end 31a of the LCD 31, and the maximum movement angle $\beta$ of the user's eyes, that is, an angle formed by a lower end 11b of the keyboard 11, the visual point E and an upper end 31b of the LCD 31 are smaller than the minimum movement angles $\alpha 1$, $\alpha 2$ and the maximum movement angles $\beta 1$, $\beta 2$ of the user's eyes in the conventional computers 500, 600. This computer 100 therefore shortens movement distances of eyes during operation and hardly tires a user even in a long-term use, thereby enhancing working efficiency.

Figure 14:
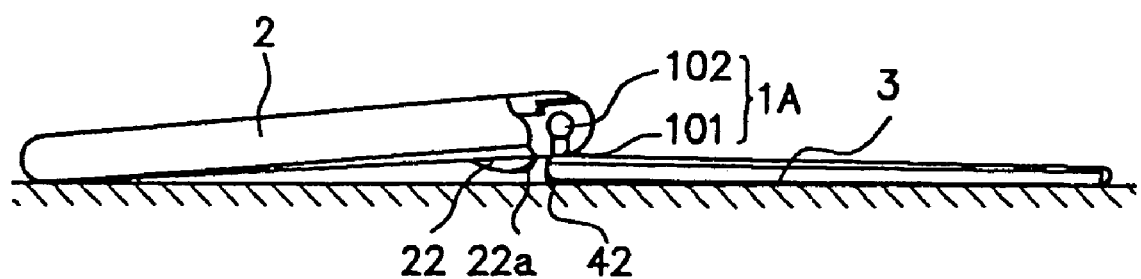
FIG. 14 is a fourth partial side view showing a condition where the computer shown in FIG. 1 having the battery pack inserted therein is put on the desk surface and the display unit is opened from the main unit.

Furthermore, the display unit 3 and the main unit 2 can be substantially leveled as shown in FIG. 14 by further opening the display unit from the main unit 2. In this condition, the protectors 42 which slightly protrude from the rear portion of the display unit 3 protect the rear portion of the display unit 3, thereby preventing the rear portion from being scratched due to rubbing with the desk surface.

Figure 20:
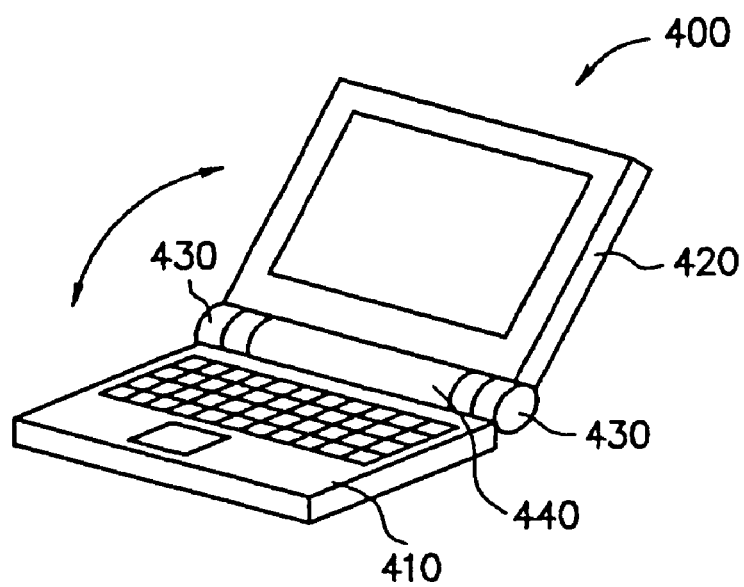
FIG. 20 is a perspective view showing a condition where a display unit of a computer as a conventional information processing apparatus is opened from a main unit.
Figure 21:
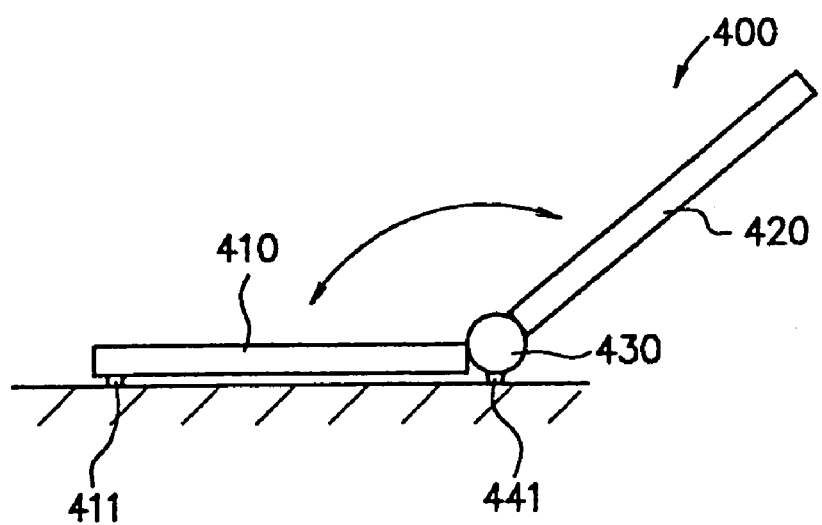
FIG. 21 is a side view of the computer shown in FIG. 20.

The computer 100 having the above described configuration further has effects which are described below. FIG. 20 is a perspective view of a computer of which the display unit is opened from the main unit, as a conventional information processing apparatus and FIG. 21 is a side view of the computer. In this computer 400, a display unit 420 is attached to a main unit 410 by a pair of hinges 430 so as to open and fold. A battery pack 440 is detachably disposed between the pair of hinges 430.

This computer 400 is put with space reserved between a desk surface and a bottom surface by a leg 411 disposed at the bottom surface of a front portion of the main unit 410 and a leg 441 disposed on the bottom surface of the battery pack 440, in order to take in cooling air for built-in electronic parts through an air suction port (not shown) formed at the bottom surface of the main unit 410.

Figure 22:
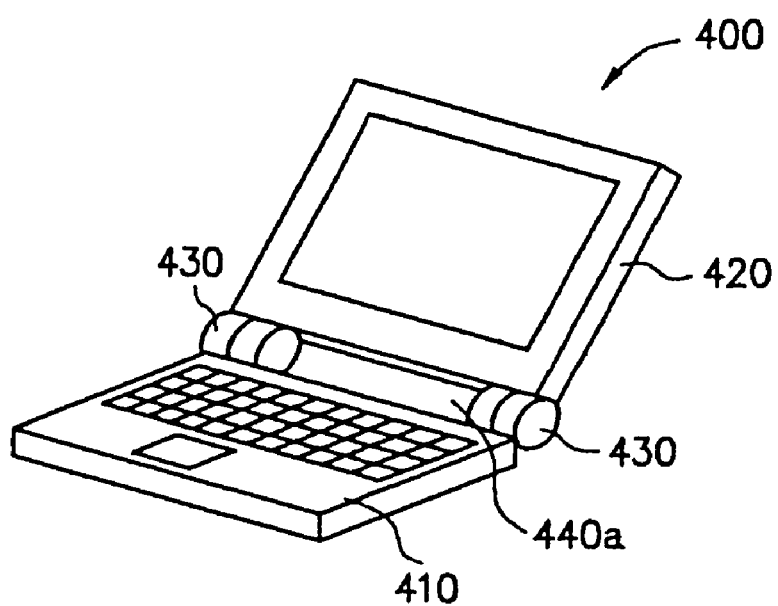
FIG. 22 is a perspective view showing a problematic point of the computer shown in FIG. 20.

When this conventional computer 400 is exhibited for sale in a condition where the display unit 420 kept open from the main unit 410, the battery pack 440 is usually removed for theft prevention. However, the computer 400 has a defect of poor appearance since the lower end of the display unit 420 moves along outer circumferences of the hinges 430 when opened and closed, and removing the battery pack 440 forms an opening 440a between the main unit 410 and the display unit 420 as shown in FIG. 22.

In contrast, the computer 100 according to the embodiment does not allow an opening to be formed, unlike the conventional computer, and has a good appearance since the battery accommodating section 2a from which the battery pack has been detached is concealed by a pent roof portion 2AA of the non-metallic panel 2A made of plastic or the like which covers the top surface of the main unit 2 as shown in FIG. 13.

While the conventional computer 400 is operated with an AC power supply after detaching the battery pack 440 from the computer 400, the computer 400 is supported by the leg 411 disposed at the bottom surface of the front portion of the main unit 410 and the bottom surface of a rear portion of the main unit 410. Accordingly, the computer 400 causes a problem that the air suction port which is formed at the bottom surface of the main unit 410 is half closed by the desk surface or the like, thereby incapable of sufficiently cooling the built-in electronic parts.

On the other hand, when the computer 100 of this embodiment is operated with an AC power supply after detaching the battery pack as shown in FIG. 13, the pair of legs 22 disposed on the main unit 2 reserves the gap between the air suction port 21 of the bottom surface of the main unit 2 and the desk surface, thereby not closing the air suction port, unlike the conventional computer, and being capable of sufficiently cooling electronic parts.

Figure 23:
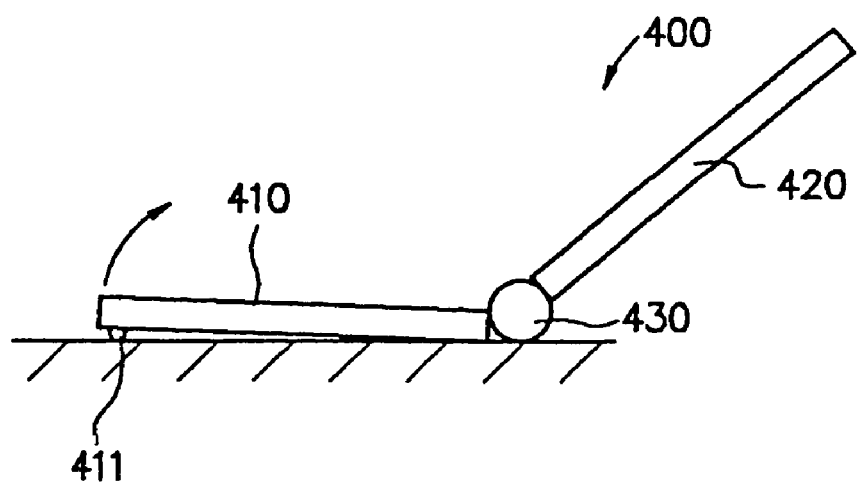
FIG. 23 is a side view showing a problematic point of the computer shown in FIG. 20.

Furthermore, the conventional computer 400 allows the main unit 410 to be inclined toward the display unit 420 side as shown in FIG. 23, thereby causing a problem that the main unit 410 is easy to turn over toward the unfolded display unit 420 side and thus the display unit 420 cannot be opened and closed smoothly.

In contrast, the computer 100 of this embodiment is supported by the pair of legs 22 as shown in FIG. 13 and the main unit 2 is maintained stably on the desk surface even while the battery pack is detached, thereby allowing the display unit 3 to be opened and closed with no change between a battery pack detached condition and a battery pack attached condition.

Figure 24:
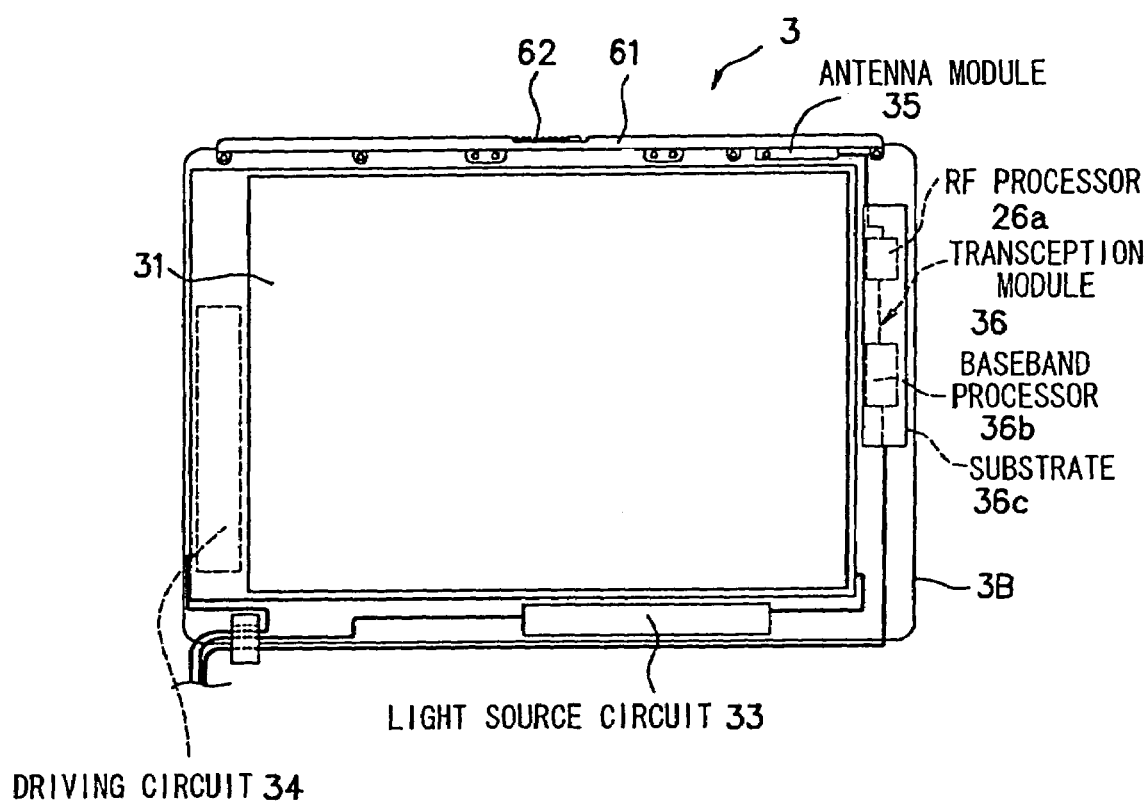
FIG. 24 is a diagram showing an internal configuration of the display unit in a condition where a non-metallic panel covering the front surface of the display unit is removed from the display unit shown in FIG. 1.

FIG. 24 is a diagram showing an internal configuration of the display unit 3 with the non-metallic panel 3A removed from the front surface of the display unit 3.

A light source circuit (inverter circuit) 33 for the LCD 31 is disposed under the LCD 31, a driving circuit 34 for the LCD 31 is disposed on a left side of the LCD 31, an antenna module 35 is disposed over the LCD31 and a transception module 36 is disposed on a right side of the LCD 31.

Since it is sufficient to dispose only the protruding portions 101 and 111 of the hinges 1A and 1B on the display unit 3 side as described above, an interior of a lower portion of the display unit 3, that is, the space under the LCD 31 in particular can be utilized effectively. Though a conventional light source circuit (inverter circuit) is disposed on the right side of an LCD, the light source circuit (inverter circuit) 33 of this embodiment is disposed under the LCD 31, the transception module 36 is disposed on the right side of the LCD 31 and the antenna module 35 is disposed over the LCD 31 in the vicinity of the transception module 36 which is preferable from a viewpoint of sensitivity so as to be capable of adopting Bluetooth.

The Bluetooth (hereinafter referred to as BT) is a name of a short-distance radio communication technique for which a standardization activity was started by five companies in Japan, Europe and the United States in 1998, and a BT system adopts a maximum data transmission speed of 1 M bits/second (effectively 721 k bits/second) and a maximum transmission distance of 10 m. The BT system sets 79 channels having a bandwidth of 1 MHz in an ISM (industrial scientific) band of 2.4 GHz which can be utilized by a user with no license and transmits radio waves by a frequency hopping type of spread spectrum technique which switches channels 1600 time per second.

An Appliance which adopts the BT is divided into a master which determines a frequency hopping pattern and slaves which are communication mates of the master. The master is capable of communicating with seven slaves at the same time. A subnet which is composed of eight appliances at maximum of a master and slaves is referred to as a piconet. A slave of a piconet can function as a slave of two or more piconets at the same time.

Figure 25:
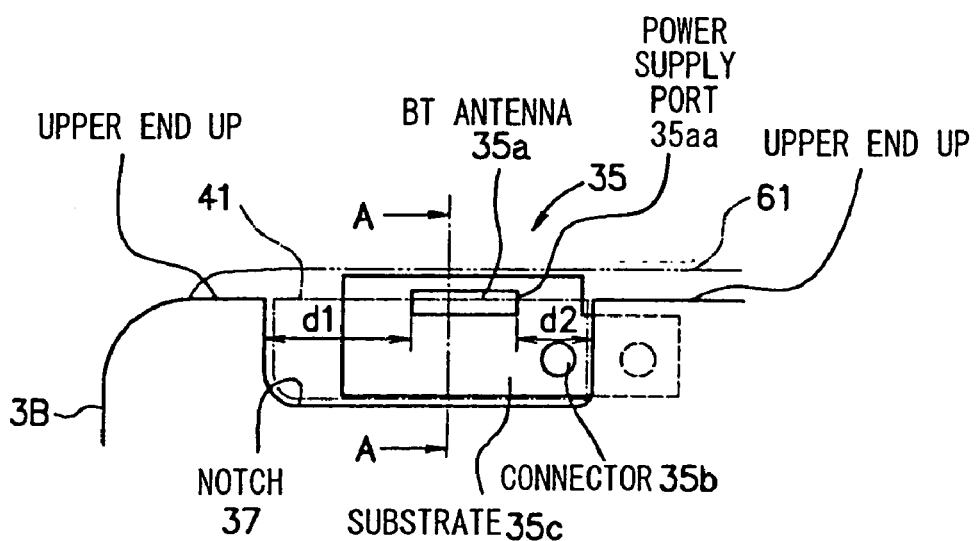
FIG. 25 is a diagram of surroundings of an antenna module shown in FIG. 1 as seen from outside the display unit, a diagram of the surroundings as seen from inside the display unit and a sectional view taken along an A—A line.
Figure 25:
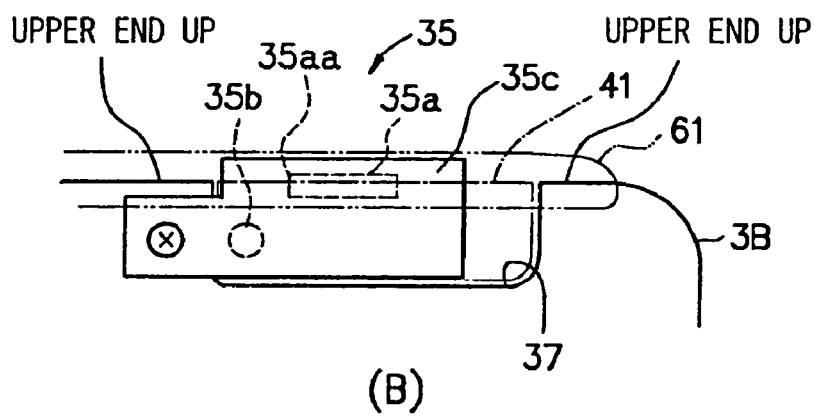
Figure 25:
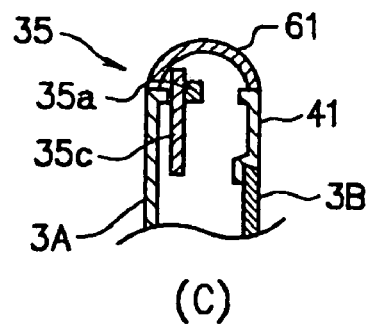

FIGS. 25(A), 25(B) and 25(C) are a view of surroundings of the antenna module 35 as seen from the rear surface of the display unit 3, a view of the surrounding of the antenna module 35 as seen from the front surface of the display unit 3 and a sectional view taken along an A—A line.

The antenna module 35 has such a configuration that a BT antenna 35a for BT communication and a connector 35b for the transception module 36 are mounted on a substrate 35c.

The antenna module 35 is built in the display unit 3 from viewpoints of portability and esthetic appearance, but as the rear part of the display unit 3 is covered with the metallic panel 3B, transception of radio waves is hindered if the BT antenna 35a completely is covered with the metallic panel 3B. The antenna module 35 is therefore disposed so that the BT antenna 35a is over the display unit 3 and slightly protrudes from an upper end UP of the metallic panel 3B, and the antenna module 35 including the protruding portion of the antenna 35a is covered with an antenna cover 61 which is made of non-metallic material such as plastic. The antenna module 35 may be disposed so that the whole BT antenna 35a protrude from the upper end of the metallic panel 3B. The BT antenna which protrudes upward improves radio wave transception quality in a left-right direction of the display unit.

In order to enhance sensitivity of the BT antenna 35a, a notch 37 is formed in the metallic panel 3B at a location where the antenna module 35 is disposed. This notch 37 is disposed so that a distance d1 from a left side of the notch 37 in FIG. 25(A) to a high sensitivity side of the BT antenna 35a, that is, to a side opposite to a power supply port 35aa is longer than a distance d2 from a right side of the notch 37 in FIG. 25(A) to the power supply port 35aa for the BT antenna 35a. The notch 37 is covered with an antenna cover 41 which is made of non-metallic material such as plastic.

Though the BT antenna 35a which is disposed on the substrate 35c of the antenna module 35 is directed outside the display unit 3 as shown in FIG. 25(C) in this embodiment, the BT antenna may be disposed as to be directed inside the display unit 3.

The transception module 36 has such a configuration that an RF processor 36a which is to be connected to the connector 35b electrically conductive to the power supply port 35aa for the antenna module 35 and a baseband processor 36b which is to be connected to a micro computer in the main unit 2 are mounted on a substrate 36c, as shown in FIG. 24.

Transmission data to be transferred by the BT communication is generated by microcomputer's processing and passed to the baseband processor 36b. The baseband processor 36b converts the data passed from the microcomputer into packets for the BT communication. At this time, the baseband processor 36b adds an error correction detecting code and various kinds of data for communication. When data generated by the baseband processor 36b is passed to the RF processor 36a, the data is converted into analog data for transmission.

The RF processor 36a modulates the passed digital data, superimposes the data on radio waves of 2.4 GHz band and sends out the data from the BT antenna 35a. As to carrier waves, different frequencies are selected for individual slots (sets of data) by frequency hopping.

On the other hand, a signal received by the BT antenna 35a is demodulated by the RF processor 36a into digital data and subjected to an error check and the like by the baseband processor 36b. Then, the digital data is passed to the microcomputer for executing corresponding processing.

FIGS. 26(A), 26(B) and 26(C) are a plan view, a side view and a right side view showing an example of a battery pack, respectively. This battery pack 200 has such a structure that a lithium ion secondary battery or the like, for example, is contained in a case 201. Since space can be kept before the air suction port 21 formed in the lower part of the main unit 2 as described above and the battery accommodating section 2a of the main unit 2 can have a size two or more times as large as conventional one, the case 201 is also two or more times as large as conventional one and is made, for example, of plastic, and a plurality of battery cells, twice or more times as many as a conventional one, is arranged in the case 201, for example, in two rows, in contrast to conventional battery cells arranged in a row.

The battery pack 200 is guided and inserted between the hinges 1A and 1B, and connected electrically and mechanically to the main unit 2. A guide mechanism and connection mechanism are formed for the battery pack 200 and the main unit 2, whereby the battery pack 200 and the main unit 2 are attachable and detachable to and from each other.

Figure 26:
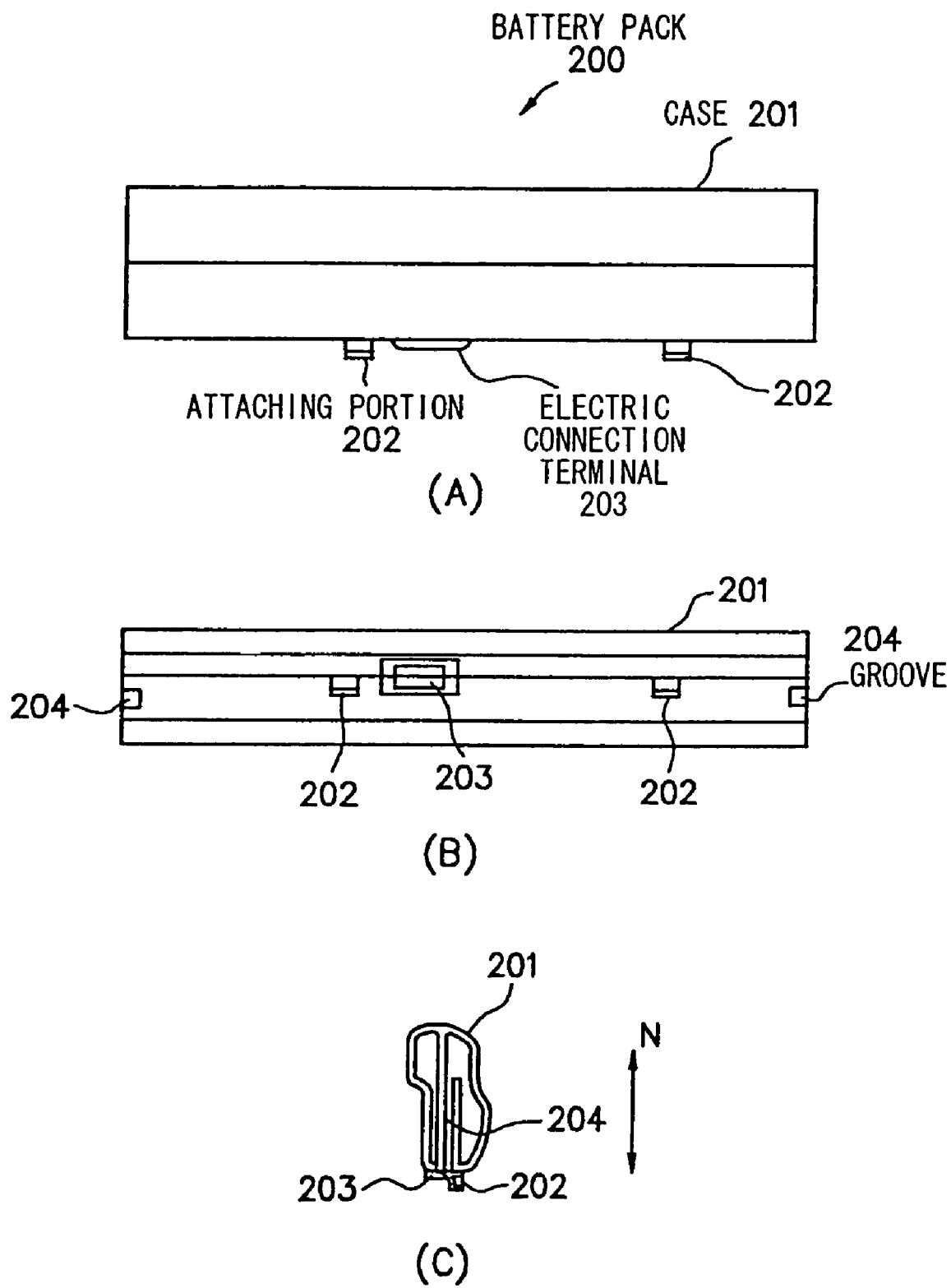
FIG. 26 is a plan view, a side view and a right side view showing an example of a battery pack for the computer shown in FIG. 1.
Figure 27:
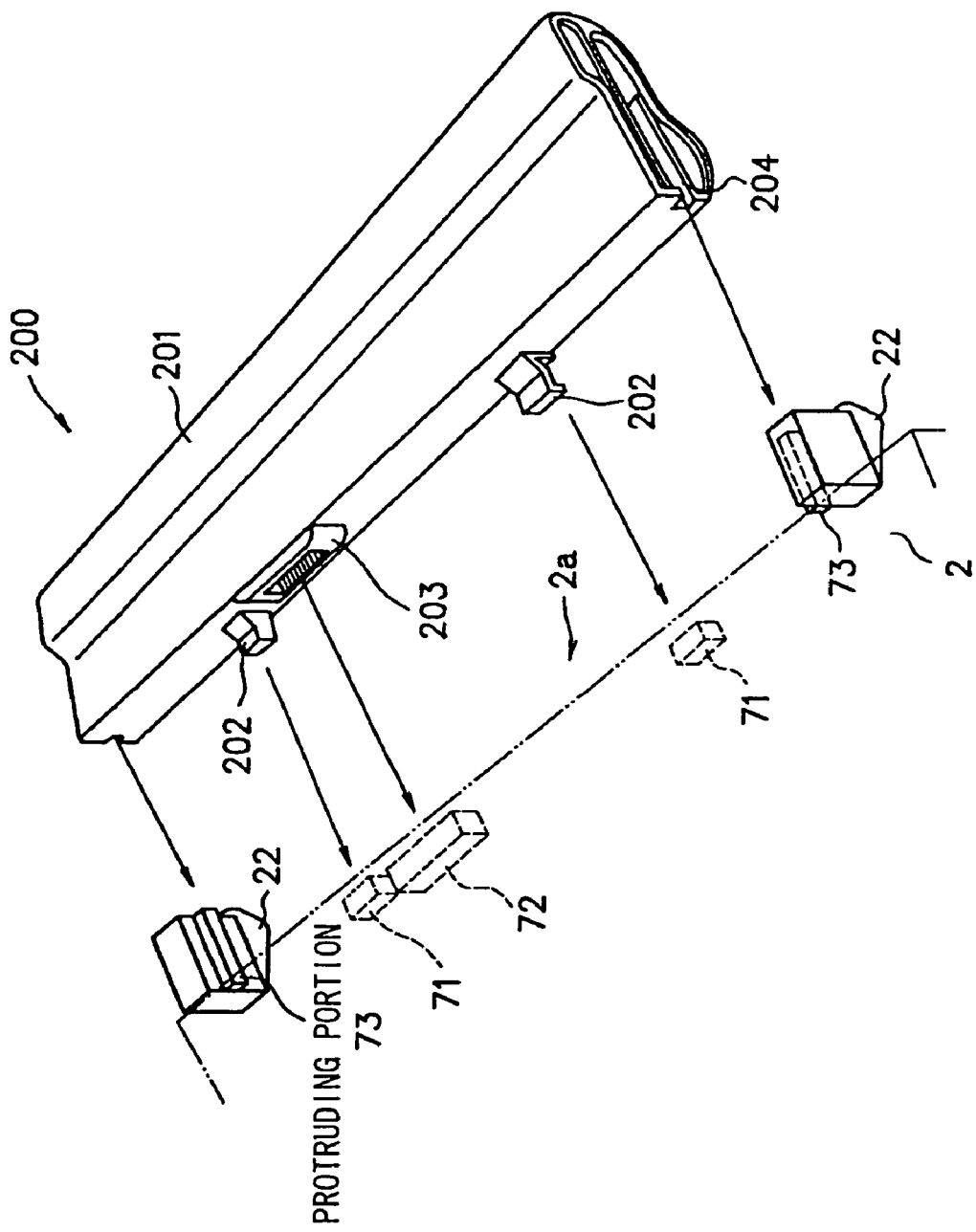
FIG. 27 is a perspective view showing an example of a battery pack for the computer shown in FIG. 1.

Specifically, a pair of attaching portions 202, an electric connection terminal 203 and a pair of grooves 204 are formed on the outer surface of the case 201 as shown in FIGS. 26 and 27. Each attaching portion 202 is formed so as to protrude from a surface of the case 201 which is to be brought into contact with the main unit 2. The electric connection terminal 203 is disposed on the surface to be brought into contact with the main unit 2 so as to protrude between the attaching portions 202. The grooves 204 are respectively formed at the left and right edges of the case 201 along a horizontal direction N.

At a rear end of the battery accommodating section 2a of the main unit 2, in contrast, battery connectors 71 and 72 which have concave shapes corresponding to the attaching portions 202 and the electric connection terminal 203 are formed as shown in FIG. 27. Furthermore, a pair of protruding portions 73 which can be fitted into the grooves 204 is formed at the both sides of the rear end of the battery accommodating portion 2a of the main unit 2, which are located substantially over the legs 22.

Figure 28:
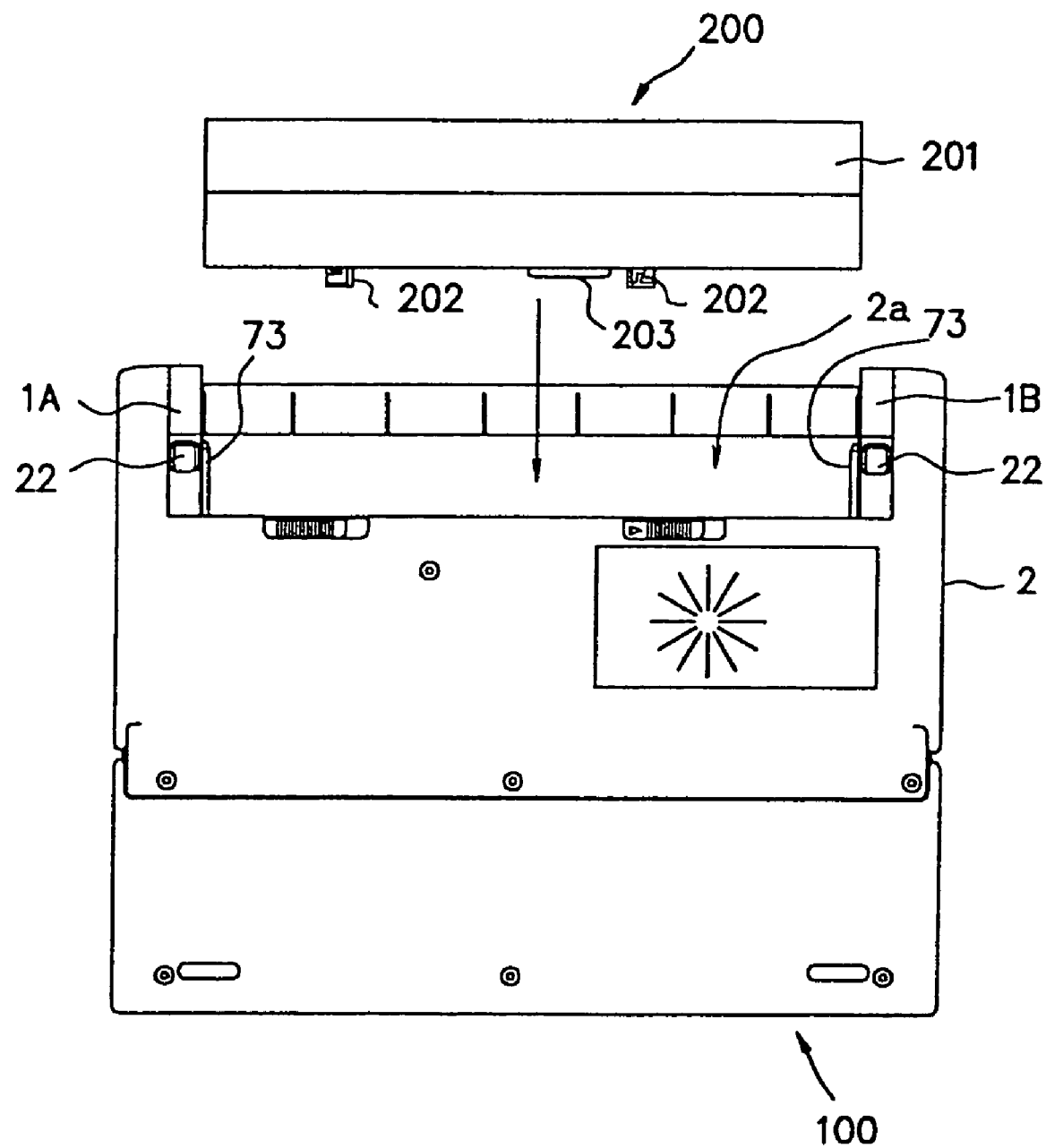
FIG. 28 is a plan view showing a condition before inserting the battery pack in the computer shown in FIG. 1.
Figure 30:
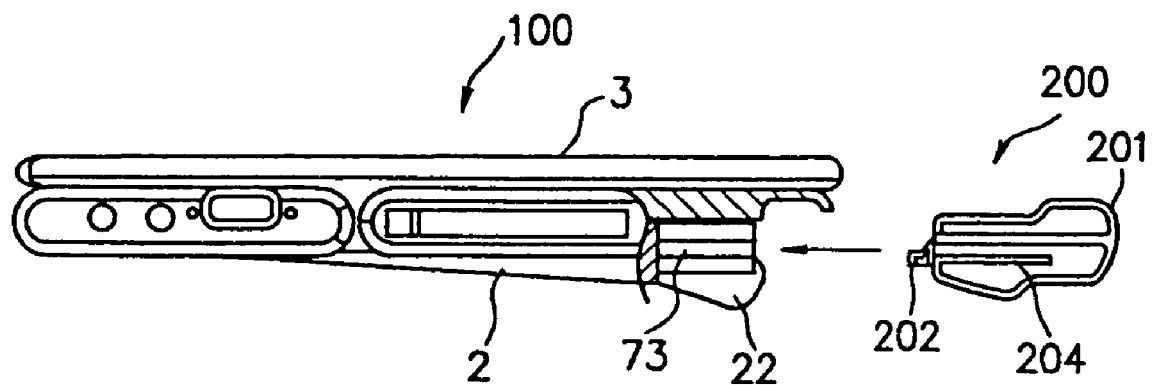
FIG. 30 is a side view showing the condition before the battery pack is inserted in the computer shown in FIG. 1.

The pair of protruding portions 73 of the main unit 2 are fitted into the pair of grooves 204 of the battery pack 200 by moving the surface of the battery pack 200 which is to be brought into contact with the main unit 2 toward the battery accommodating section 2a as shown in FIGS. 28 and 30. Accordingly, the battery pack 200 is capable of moving in the battery accommodating section 2a horizontally along the protruding portions 73.

The pair of attaching portions 202 and the electric connection terminal 203 of the battery pack 200 are fitted into the connectors 71 and 72 of the main unit 2 as shown in FIGS. 29 and 31. Accordingly, the battery pack 200 is removably attached to the main unit 2 securely, electrically, and mechanically.

Since the grooves 204 and the protruding portions 73 can guide the battery pack 200 as described above, it is possible to prevent the electric connection terminal 203 from being broken due to stresses produced at steps of attaching and detaching the electric connection terminal 203 of the battery pack 200 to and from the battery connector 72. In a condition where the battery pack 200 is inserted in the main unit 2, driving power is supplied from the battery pack 200 to the main unit 2 via the electric connection terminal 203 and the battery connector 72.

Though the above described guide mechanism is a combination of the grooves 204 which are formed at the both ends of the battery pack 200 and the protruding portions 73 which are formed on the surfaces of the main unit 2 facing the both ends of the battery pack 200, it is needless to say that the grooves 204 and the protruding portions 73 may be formed in an opposite way. That is, it is possible to form grooves similar to the grooves 204 on the surfaces of the main body 2 corresponding to the both ends of the battery pack 200 and to form protruding portions similar to the protruding portions 73 at the both ends of the battery pack 200.

Figure 32:
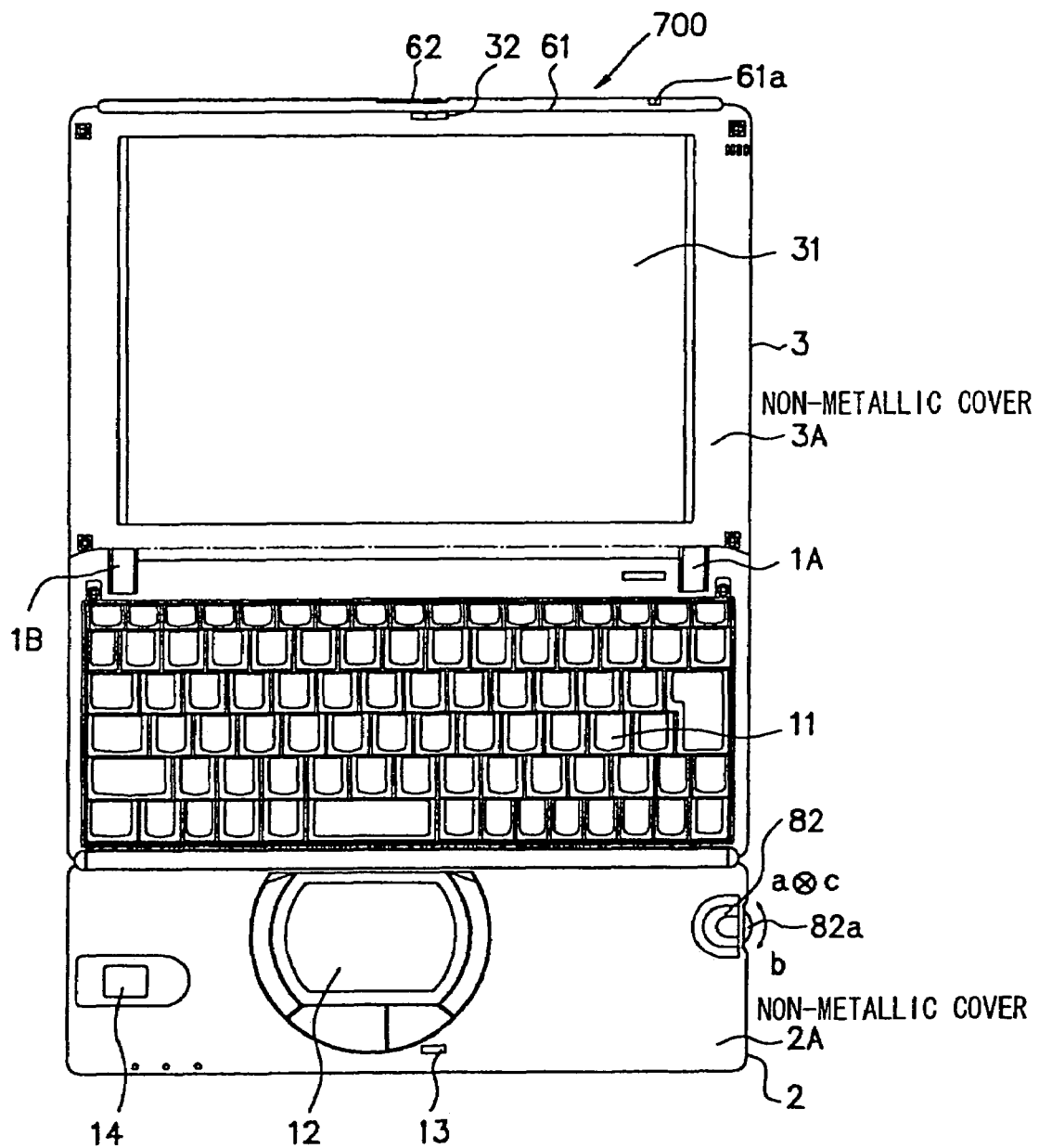
FIG. 32 is a perspective view showing a portable computer as a second embodiment of the information processing apparatus in the present invention.

FIG. 32 is a perspective view showing a portable computer 700 as a second embodiment of the information processing apparatus in the present invention. Unlike the computer 100 of the above described first embodiment, the computer 700 of this embodiment has an LED light conduction lens unit 800 disposed as a light emitting means at an antenna cover 61 or the like. This light conduction unit 800 is equipped with an LED 900 which is a light emitting diode.

However, most of the other components are similar to those of the portable computer of the first embodiment.

Description will therefore be made mainly of components which are different from those of the first embodiment and the similar components will be denoted by the same reference numerals with no description in particular.

Unlike the portable computer 100 of the above described first embodiment, the portable computer 700 of this embodiment has a light emitting transparent portion 61a which is partially composed of a transparent member and formed in an antenna cover 61 that is a side cover.

Since the LED light conduction lens unit 800 is disposed in the antenna cover 61 at a position corresponding to the light emitting transparent portion 61a, light from the LED light conduction unit 800 is emitted outside the portable computer 700 through the light emitting transparent portion 61a.

The LED light conduction lens unit 800 is configured to emit light from the LED 900 while communication is carried out in the above described BT mode. Specifically, the LED 900 in the LED light conduction lens unit 800 lights or flickers while a BT antenna 35a which is disposed in the vicinity of the LED light conduction lens unit 800 in the antenna cover 61 receives and transmits a signal.

Accordingly, a user of the portable computer 700 can recognize that the BT antenna 35a is transmitting or receiving a signal, while the LED 900 of the LED light conduction lens unit 800 is lighting or flickering, and when he sets the LED light conduction lens unit 800 in a favorable direction for communication, the BT antenna in the vicinity of the lens unit 800 is also set in the favorable direction for communication accordingly. It is therefore easy for the user to comprehend a directivity of radio communication.

When another person is to transmit a radio communication signal to the portable computer 700 using his computer in a dark environment, he can carry out short-distance radio communication favorably by transmitting the signal to the LED light conduction lens unit 800 having the lighting or flickering LED 900 of the portable computer 700.

Furthermore, the user can easily comprehend a reception or transmission sensitivity in a poor communication condition because the LED 900 of the LED light conduction lens unit 800 does not light or flicker.

In addition, its appearance become remarkably smart.

Description will be made in detail of the LED light conduction lens unit 800, the BT antenna 35a, the light emitting transparent portion 61a, antenna cover 61 and the like of the portable computer 700 of the second embodiment which has excellent functions and effects as described above.

Figure 33:
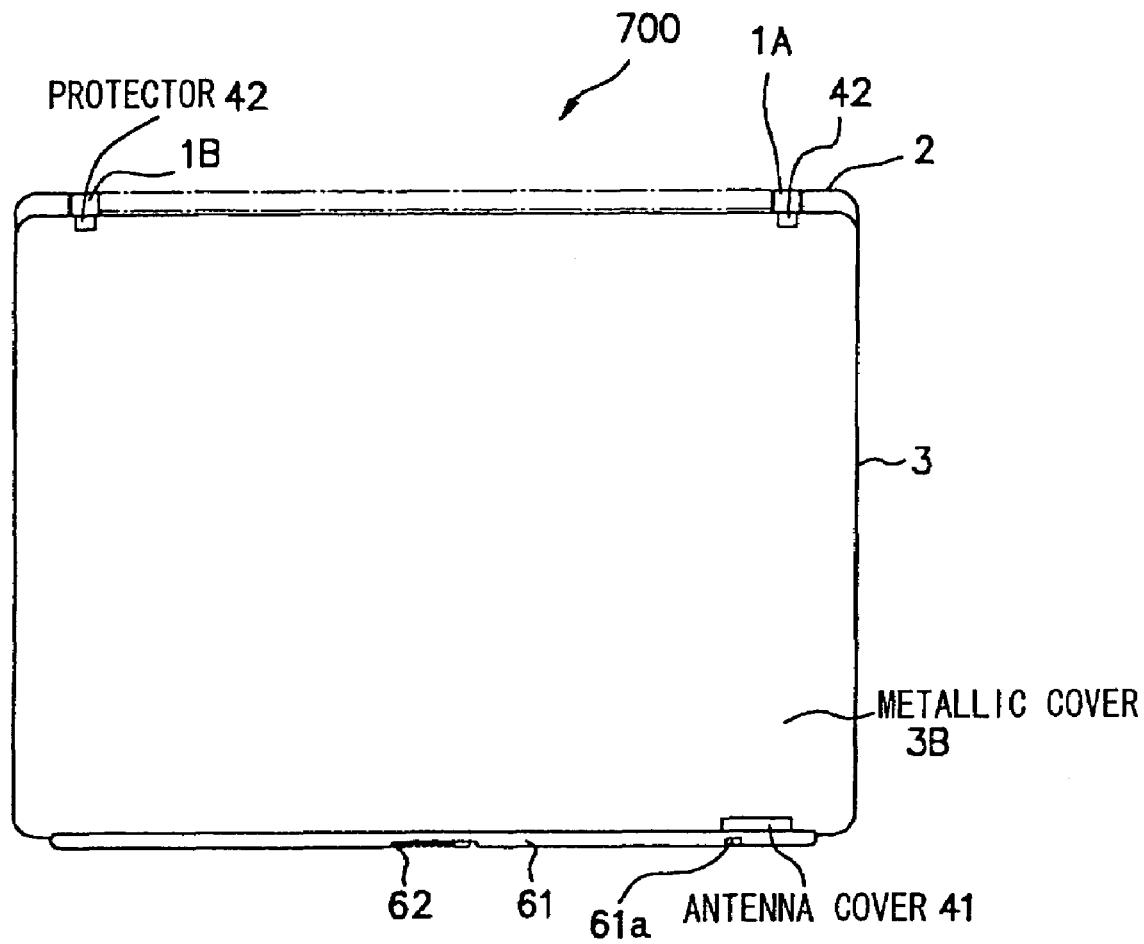
FIG. 33 is a plan view showing a condition where a display unit of the computer shown in FIG. 32 is folded against a main unit as seen from the display unit side.

FIG. 33 is a diagram showing an arrangement of the light emitting transparent portion 61a disposed in the antenna cover 61 shown in FIG. 32 as seen from outside the display unit 3. The light emitting transparent portion 61a is disposed in the antenna cover 61 so as to be easily recognized from both the inside which is the front surface side of the display unit 3 and the outside, as shown in FIG. 33.

Thereby, even in a condition where the display unit 3 is tilted toward the main unit 2, the BT antenna 35a receives a radio signal of the BT mode and a user is easy to recognize lighting or flickering of the LED 900 when the LED 900 of the LED light conduction lens unit 800 lights or flickers.

Figure 34:
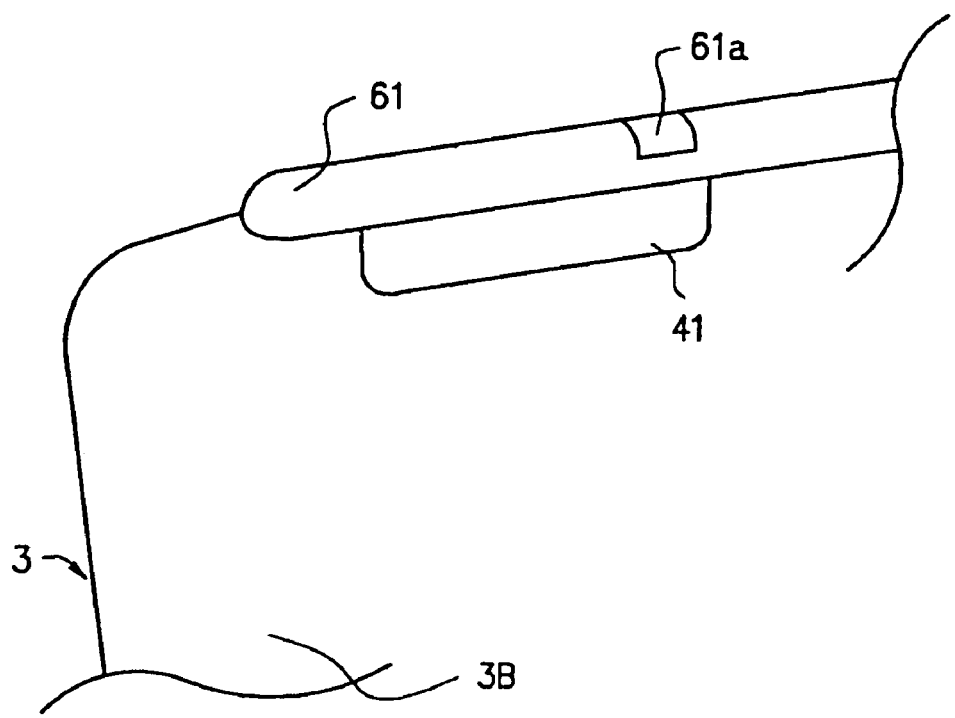
FIG. 34 is a diagram showing arrangements of the display unit, an antenna cover, a light emitting transparent portion and the like shown in FIG. 33.

FIG. 34 is a diagram showing an arrangement of the display unit 3, the metallic panel 3B, the antenna cover 61 that is a side cover, the antenna cover 41 that is also a side cover, the light emitting transparent potion 61a and the like which are shown in FIG. 33. Furthermore, FIG. 35 is a schematic sectional view showing an arrangement of the LED light conduction lens unit 800, the antenna cover 61 and the light emitting transparent portion 61a.

Figure 35:
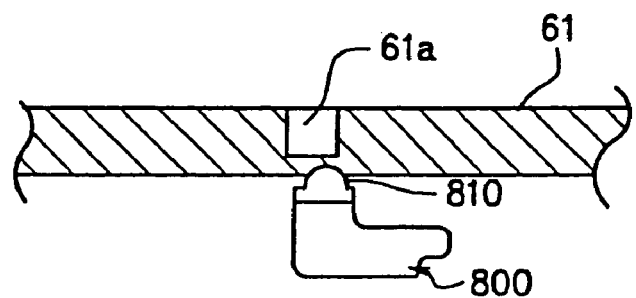
FIG. 35 is a schematic sectional view showing arrangements of an LED light conduction lens unit, the antenna cover and the light emitting transparent portion.

A dome-shaped lens 810 of the LED light conduction lens unit 800 which emits light from the LED is arranged right under the light emitting transparent portion 61a as shown in FIG. 35. Therefore, the LED light through the dome-shaped lens 810 is emitted outside through the light emitting transparent portion 61a wastelessly.

Figure 36:
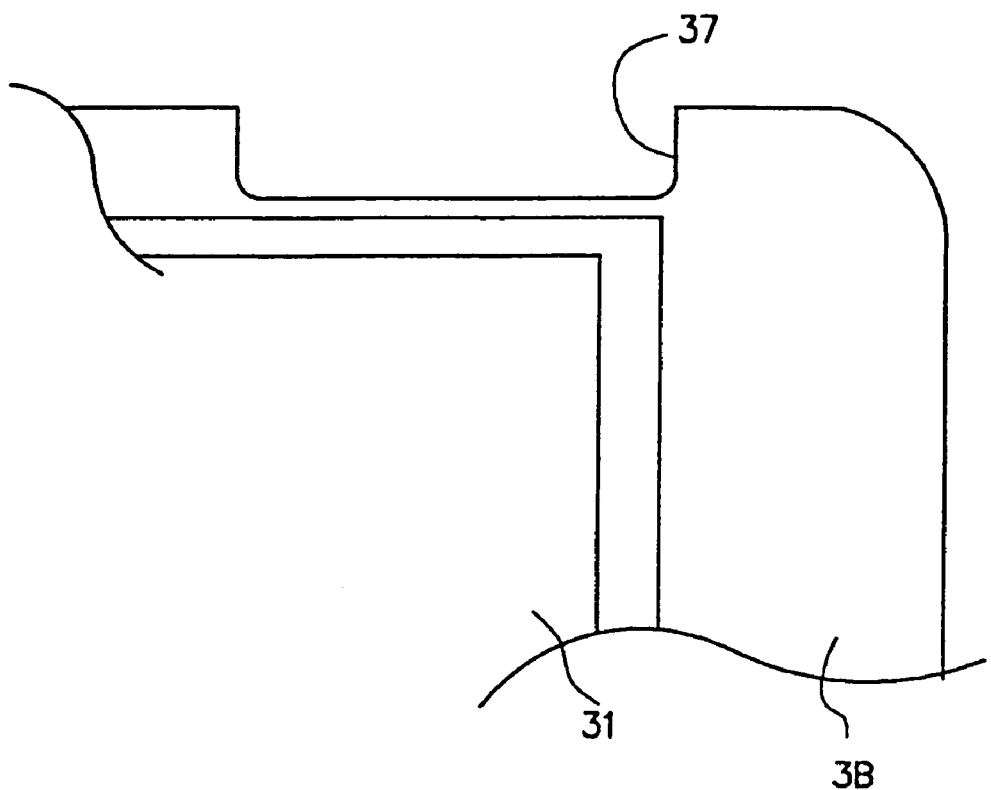
FIG. 36 is a schematic diagram of a notch formed in the display unit as seen from an LCD side which is a front surface side of the display unit.

FIG. 36 is a diagram of the notch 37 formed in the metallic panel 3B of the display unit 3 as seen from the LCD 31 side which is the display side of the display unit 3.

A sensitivity of the BT antenna 35a is enhanced by forming the notch 37 in the metallic panel 3B of the display unit 3 and disposing the BT antenna 35a in this notch 37 as described above.

Figure 37:
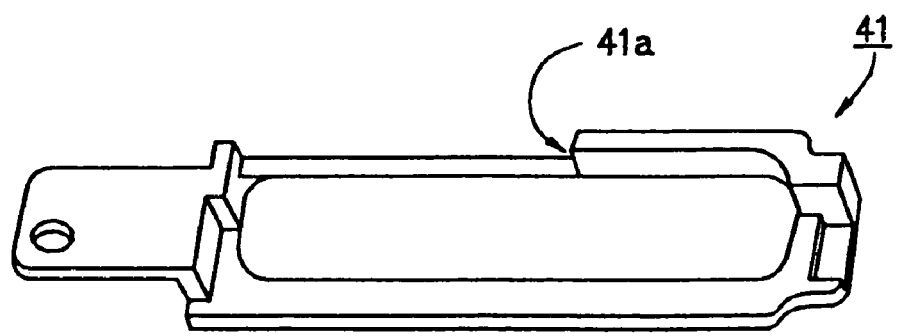
FIG. 37 is a schematic perspective view showing the antenna cover.

Furthermore, the antenna cover 41 which is made of plastic or the like shown in FIG. 37 is disposed in this notch 37.

Figure 38:
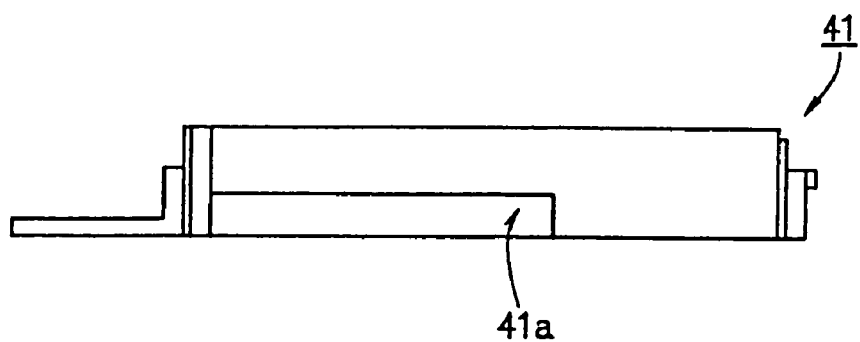
FIG. 38 is a schematic diagram of the antenna cover shown in FIG. 37 as seen from a direction indicated by an arrow in FIG. 37.

FIG. 38 is a diagram of the antenna cover 41 as seen from a direction indicated by an arrow. An antenna cover notch 41a is formed in the antenna cover 41 as shown in FIGS. 37 and 38, and the antenna cover 41 is disposed so that the dome-shaped lens 810, and BT antenna 35a and the like protrude from the antenna cover notch 41a as described later.

Figure 39:
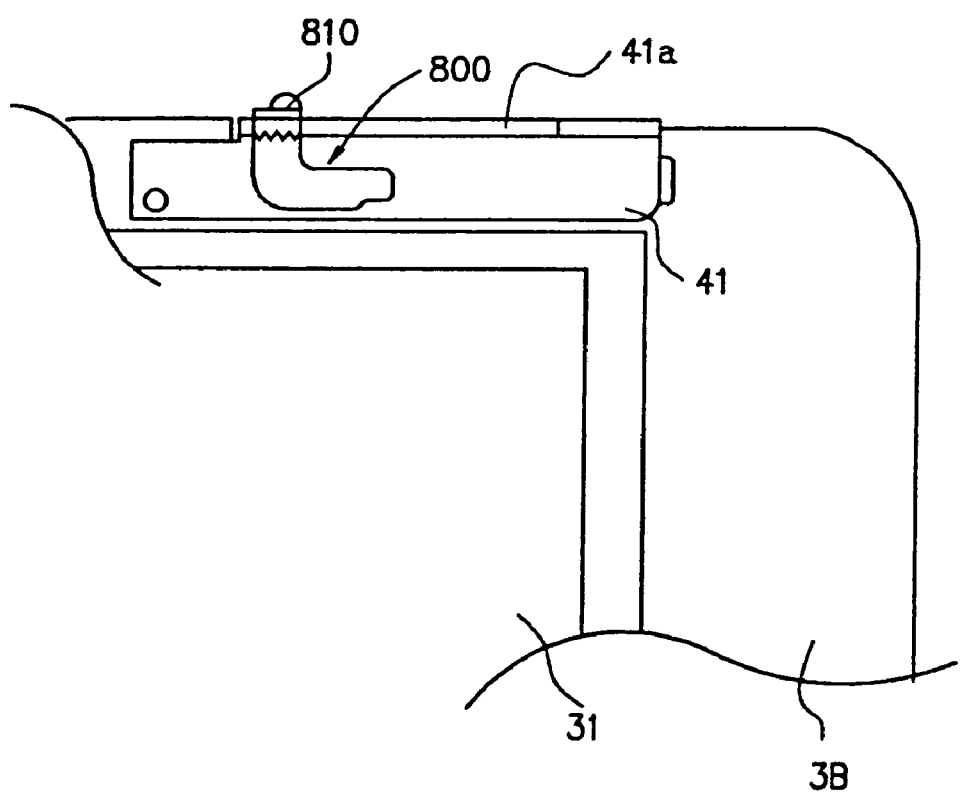
FIG. 39 is a schematic diagram showing a condition where the antenna cover shown in FIG. 37 is disposed in the notch shown in FIG. 36 and the LED light conduction lens unit is disposed on the antenna cover.

FIG. 39 is a diagram showing a condition where the antenna cover 41 shown in FIG. 37 is disposed in the notch 37 shown in FIG. 36, the LED 900 is not mounted on the antenna cover 41 and the LED light conduction lens unit 800 is disposed. In this condition, the LED light conduction lens unit 800 is disposed so that the dome-shaped lens 810 protrudes from the antenna cover notch 41a protrudes upward from the antenna cover notch 41a in the drawing.

Figure 40:
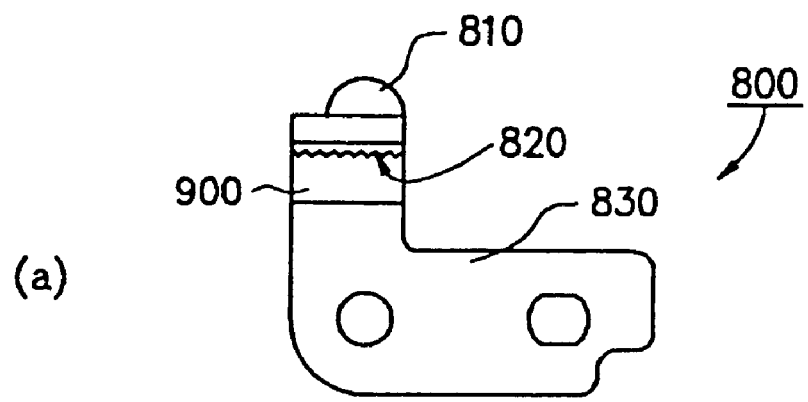
FIG. 40(*a*) is a schematic diagram showing the LED light conduction lens unit, FIG. 40(*b*) is a schematic plan view of the LED light conduction lens unit shown in FIG. 40(*a*) and FIG. 40(*c*) is a schematic right side view of the LED light conduction lens unit shown in FIG. 40(*a*).
Figure 40:
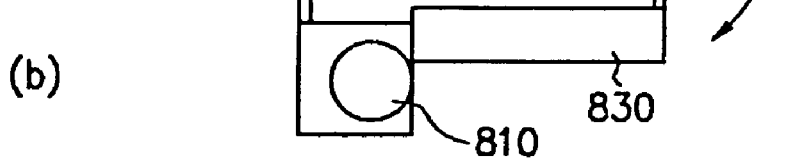
Figure 40:
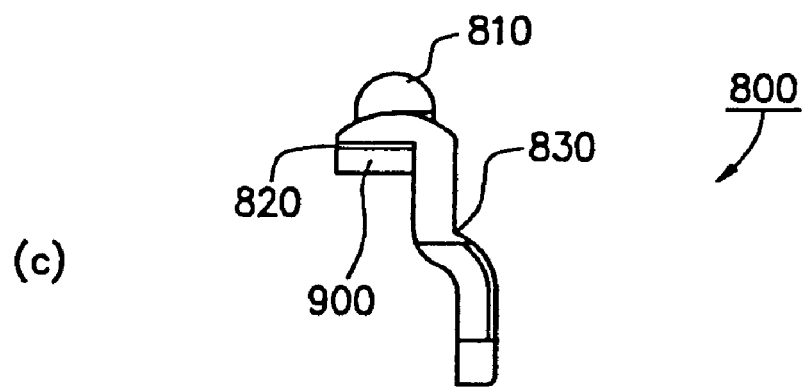

FIGS. 40(a), 40(b) and 40(c) are diagrams showing the LED light conduction lens unit 800 shown in FIG. 39. The LED light conduction lens unit 800 has a holder portion 830 in which the LED is to be disposed and the dome-shaped lens 810 as shown in FIG. 40(a). Further, disposed right under the dome-shaped lens 810 in the drawing is a scattering portion 820 for scattering light from the LED, thereby emitting the light uniformly from the dome-shaped lens 810.

The scattering portion 820 is configured to have continuous peaks so that the light emitted from the LED are scattered by inclined surfaces of the peaks and the like, and not concentrated on one point.

The LED 900 which is disposed on a substrate 35c described later is arranged under the scattering portion 820 as shown in FIGS. 40(a) and 40(b).

Figure 41:
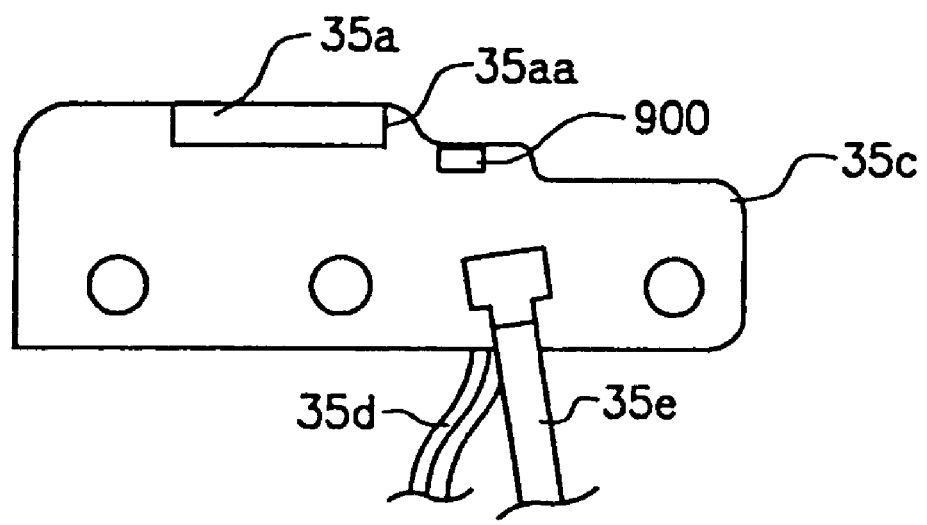
FIG. 41 is a schematic diagram showing a condition where an LED, a BT antenna and the like are disposed on a substrate.

FIG. 41 is a diagram showing an arrangement where the LED 900, the BT antenna 35a and the like are disposed on the substrate 35c that is the antenna substrate.

Connected to the substrate 35c is an LED power supply 35d which supplies electricity to the LED 900 as shown in FIG. 41. Thereby, electricity is supplied to the LED 900 by way of this substrate 35c.

Furthermore, connected to the substrate 35c is also a power supply port connector 35e for supplying electricity to the power supply port 35aa. Thereby, electricity is supplied also to the power supply port 35aa for the BT antenna 35a by way of this substrate 35c.

Figure 42:
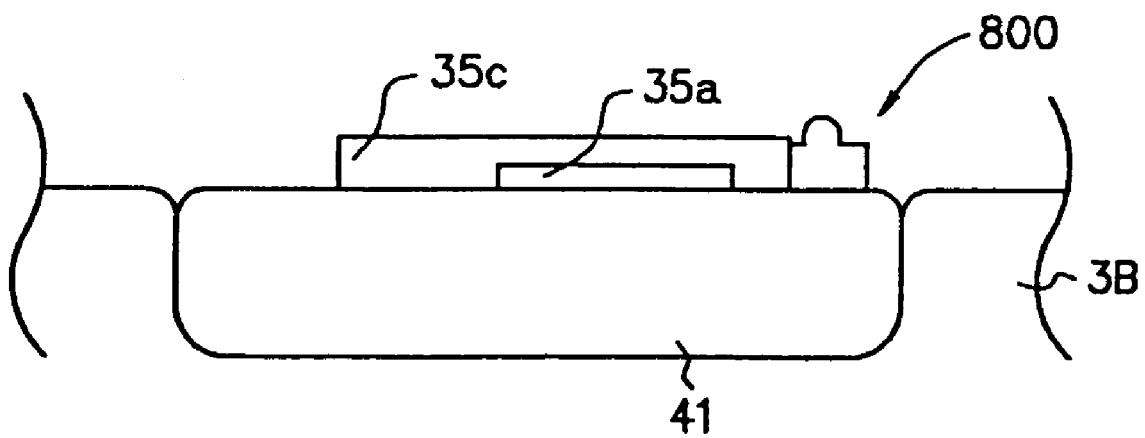
FIG. 42 is a schematic diagram showing a condition where the substrate shown in FIG. 41 is disposed on the antenna cover shown in FIG. 37 and the antenna cover is disposed in the notch shown in FIG. 36.

FIG. 42 is a diagram showing an arrangement where the substrate 35c having the LED light conduction lens unit 800 and the like mounted thereon is disposed on the antenna cover 41 shown in FIG. 37 and the antenna cover 41 is disposed in the notch 37 shown in FIG. 36.

Furthermore, FIG. 42 is a diagram of this arrangement as seen from the outside of the metallic panel 3B of the display unit 3. As shown in FIG. 42, a portion of the LED light conduction lens unit 800, a portion of the substrate 35c and the BT antenna 35a disposed on the substrate 35c protrude upward from the antenna cover notch 41a of the antenna cover 41 as shown in FIG. 42.

Since the BT antenna 35c is formed so as to protrude in particular, a radio signal can be transmitted and received with a high sensitivity without being hindered by the metallic panel 3B of the display unit 3.

Figure 43:
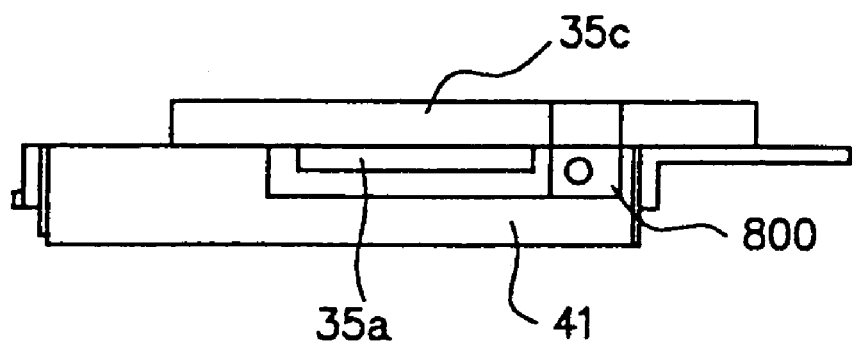
FIG. 43 is a schematic plan view showing arrangements of the LED light conduction lens unit, the BT antenna, the antenna cover and the like on the substrate shown in FIG. 42.

FIG. 43 is a schematic plan view showing an arrangement of the antenna cover 41, the BT antenna 35a, the LED light conduction lens unit 800, the substrate 35c and the like shown in FIG. 42. That is, FIG. 43 is a diagram of a condition where the antenna cover 61 to be attached to a top end of the display unit 3 is not attached, as seen from the top end side of the display unit 3.

Figure 44:
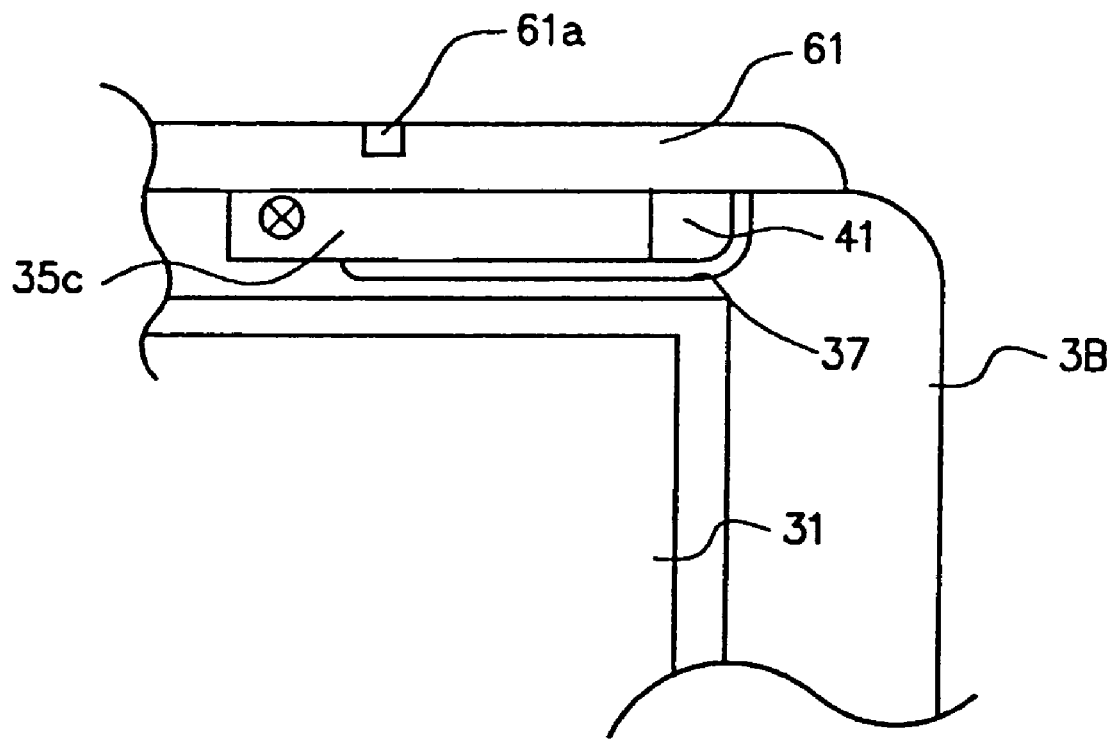
FIG. 44 is a schematic diagram showing a condition of the antenna cover disposed over the top portion shown in FIG. 42 as seen from the LCD side which is opposite to FIG. 42.

FIG. 44 is a diagram showing an arrangement where the antenna cover 61 is disposed at the top end of the display unit 3 shown in FIG. 42. That is, FIG. 44 is a diagram of a condition where the non-metallic panel 3A is removed from the front surface of the display unit 3 and the antenna cover 61 is disposed, as seen from the LCD 31 side which is opposite to the side in FIG. 42. When this condition is seen from the outside of the display unit 3, it will be FIG. 34.

The portable computer 700 of this embodiment is capable of receiving and transmitting a radio signal with a high sensitivity in the BT mode as described above. Since the light emitting transparent portion 61a of the antenna cover 61 lights or flickers during transception of the radio signal, a communication sensitivity can be recognized clearly. Since the BT antenna 35c is disposed in the vicinity of the light emitting transparent portion 61a, a user can easily recognize a location of the BT antenna and comprehend a directivity of radio waves. Furthermore, a communicating mate understands that reception is facilitated by transmission toward the lighting or flickering position and can carry out communication smoothly.

(Modification Examples of Second Embodiment)

Figure 45:
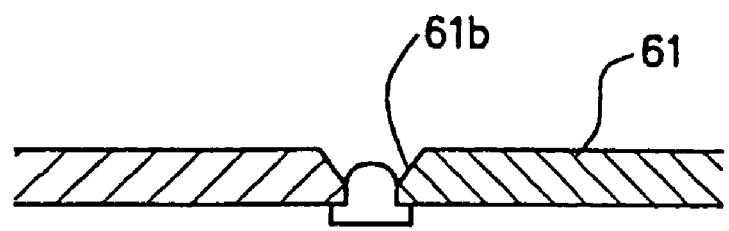
FIG. 45 is a schematic sectional view showing a modification example of the portable computer in the second embodiment.
Figure 46:
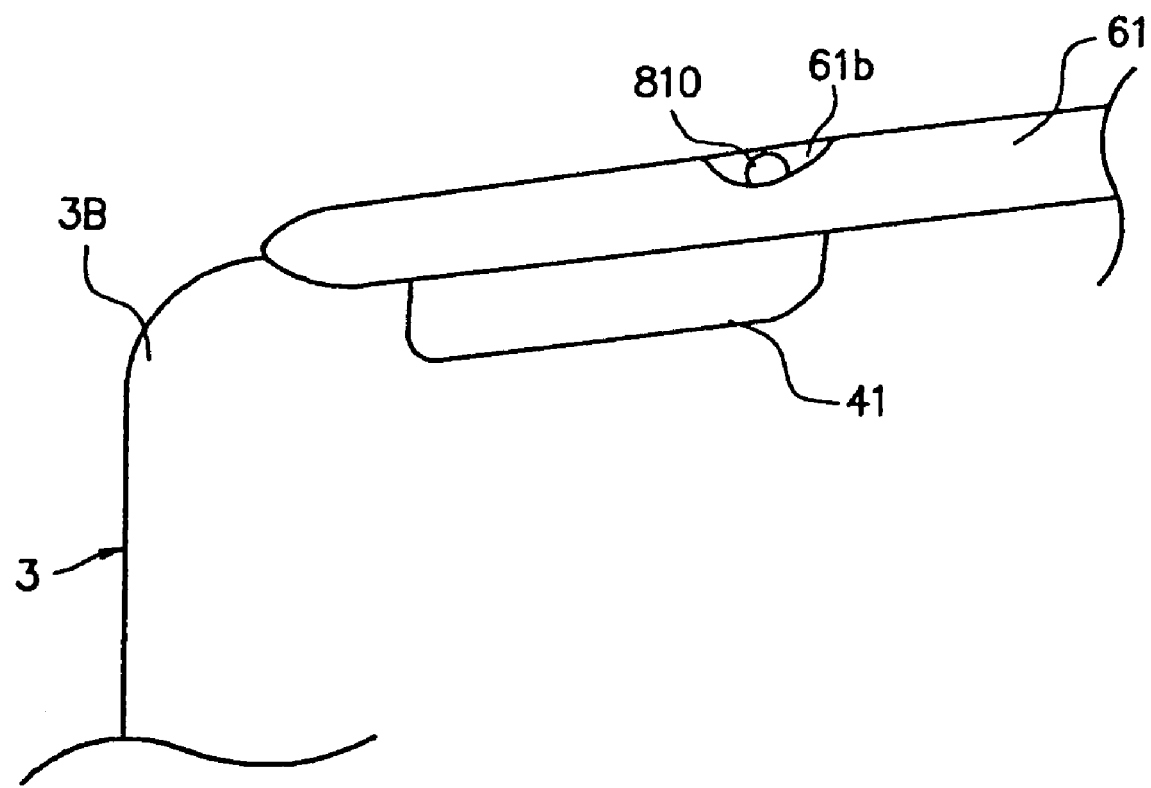
FIG. 46 is a schematic perspective view showing a modification example of the portable computer according to the second embodiment.
Figure 47:
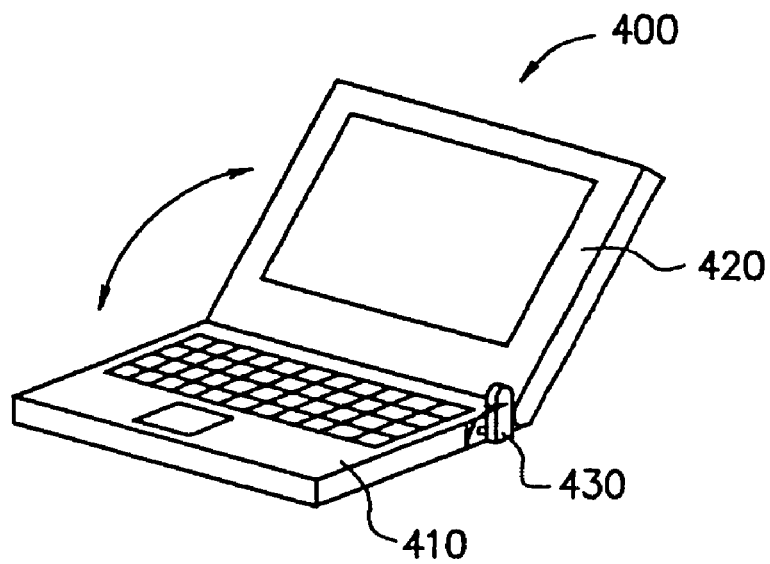
FIG. 47 is a perspective view showing a condition where a display unit of a computer having an antenna and the like as a conventional information processing apparatus is opened from a main unit.
Figure 48:
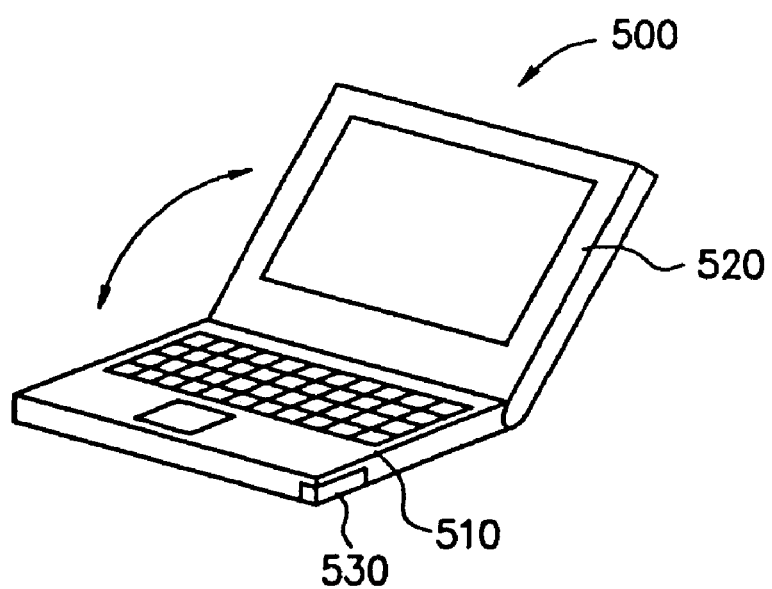
FIG. 48 is a perspective view showing a condition where a display unit of a computer having an antenna and the like as another conventional information processing apparatus is opened from a main unit.

FIGS. 45 and 46 are diagrams showing a modification example of the computer 700 of the above described second embodiment.

Unlike the second embodiment, this modification example uses, in place of the light emitting transparent portion 61a, a light emitting notch 61b formed in the antenna cover 61. Thereby, the dome-shaped lens 810 of the LED light conduction lens unit 800 exposed from the light emitting notch 61b as shown in FIG. 46.

Though the notch is formed in part of the metallic panel in each of the above described embodiments, it is possible to use, in place of the metallic panel, a panel made of a non-metallic member which has an inside surface treated for shielding from electromagnetic waves. Methods for shielding treatment against the electromagnetic waves are a method for coating with an electrically conductive paint, a method for metal plating, a method for depositing a metal, a method for spreading a metal foil and the like. Though the portable computers are mentioned as examples in the above described embodiments, the present invention is not limited to this and the present invention is similarly applicable also to other kinds of information processing apparatuses, for example, portable information terminals, portable telephones and radio devices.

As described above, the present invention is configured to dispose an antenna in a notch formed in a metallic panel, thereby making it possible to allow radio waves to be securely received by the antenna or transmitted from the antenna without being intercepted by the metallic panel, so that accurate data can always be received and transmitted securely and rapidly.

INDUSTRIAL UTILIZATION

The present invention can be applied to portable personal computers, mobile computers, and other kinds of information processing apparatuses, for example, portable information apparatuses such as a portable information terminal, a portable telephone and a radio device.

What is claimed is:

1. An information processing apparatus comprising:
   a display unit having a display panel of which rear side is covered with a metallic panel;
   an antenna member which is disposed in a notch formed in part of said metallic panel;
   a cover of a non-metallic member which is disposed in said notch so as to cover said antenna member;
   a main unit, wherein one side portion of said display unit is hinged to one side portion of said main unit so that said display unit is capable of opening and folding from and against said main unit, and said antenna member is disposed in said notch formed in the other side portion of said display unit opposed to said one side portion, wherein said antenna member is disposed so as to protrude at least partially from a side surface of said other side portion of said display unit;
   a side surface cover which is disposed on said side surface of the other side portion so as to cover said antenna member that protrudes;
   light emitting means which lights or flickers at a signal transmission time, and wherein said side surface cover is disposed so as to cover said light emitting means, wherein said antenna member is located in an off center position of a side portion of said display unit.

2. The information processing apparatus according to claim 1, wherein
   said antenna member is disposed so as to protrude at least partially from a side surface of one side portion of said display unit.

3. The information processing apparatus according to claim 2 comprising
   a side surface cover which is disposed on said side surface of the side portion so as to cover said antenna member that protrudes.

4. The information processing apparatus according to claim 1, wherein
   said antenna member is disposed so that a distance between an end of said antenna member on a side of a power supply port and an end of said notch on the side of said power supply port is shorter than a distance between an end of said antenna member on a side opposite to the power supply port and an end of said notch on the side opposite to said power supply port.

5. The information processing apparatus according to claim 1 comprising:
   an antenna substrate having said antenna member mounted thereon; and
   a light emitting diode disposed on said antenna substrate, and wherein
   said side surface cover is disposed so as to cover said light emitting diode.

* * * * *